United States Patent
Beck et al.

(10) Patent No.: US 7,036,482 B2
(45) Date of Patent: *May 2, 2006

(54) MULTI-FUEL COMPRESSION IGNITION ENGINE

(75) Inventors: Niels Johannes Beck, Bonita, CA (US); Kresimir Gebert, Villa Park, IL (US); Hoi-Ching Wong, San Diego, CA (US)

(73) Assignee: Clean Air Power, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/628,323

(22) Filed: Jul. 28, 2003

(65) Prior Publication Data

US 2004/0118116 A1 Jun. 24, 2004

Related U.S. Application Data

(63) Continuation-in-part of application No. 09/791,195, filed on Feb. 23, 2001, now Pat. No. 6,598,584.

(51) Int. Cl.
*F02B 3/00* (2006.01)

(52) U.S. Cl. .................. 123/229; 123/300; 123/305

(58) Field of Classification Search ............... 123/299, 123/300, 304, 276, 27 GE, 25 C, 478, 47 R, 123/336; 239/2.1, 533.2
See application file for complete search history.

(56) References Cited

U.S. PATENT DOCUMENTS

| | | | |
|---|---|---|---|
| 3,788,542 A * | 1/1974 | Mee .............................. | 239/2.1 |
| 4,358,414 A * | 11/1982 | Webster et al. .............. | 123/336 |
| 4,429,675 A * | 2/1984 | Talbert ......................... | 123/558 |
| 4,621,599 A | 11/1986 | Igashira et al. .............. | 123/305 |
| 5,771,857 A | 6/1998 | Willi ............................. | 123/305 |
| 5,832,880 A * | 11/1998 | Dickey ......................... | 123/25 C |

(Continued)

FOREIGN PATENT DOCUMENTS

WO      WO 97 36103 A      10/1997

(Continued)

OTHER PUBLICATIONS

Uwe Wagner, Razvan Anca, Amin Veilji and Ulrich Spicher, SAE Paper No. 2003-01-2293. "*An Experimental Study of Homogenous Charge Compression Ignition (HCCI) with Various Compression Ratios, Intake Air Temperature and Fuels with Prot and Direct Fuel Injection,*" Jun. 23, 2003.

(Continued)

*Primary Examiner*—Thai-Ba Trieu
(74) *Attorney, Agent, or Firm*—Boyle Fredrickson Newholm Stein & Gratz S.C.

(57) ABSTRACT

A liquid primary fuel is ignited by HCCI with the assistance of the early injection of a liquid pilot fuel. Pilot fuel injection and/or ignition are preferably controlled so as to permit the injected pilot fuel to become thoroughly distributed through and mixed with the primary fuel/air charge in the combustion chamber and vaporized prior to ignition. Pilot fuel having a lower autoignition temperature will be ignited by compression ignition, followed by the ignition of the homogeneous mixture of the primary fuel and air. HCCI combustion of the primary fuel is facilitated by 1) selection of the properties of the primary and pilot fuels and 2) obtaining a homogenous mixture of primary fuel and air by injecting primary fuel into the engine's intake air stream in the form of finely atomized droplets having a mean diameter in the micron range.

39 Claims, 18 Drawing Sheets

U.S. PATENT DOCUMENTS

| | | | | |
|---|---|---|---|---|
| 5,875,743 | A * | 3/1999 | Dickey | 123/25 C |
| 5,924,403 | A | 7/1999 | Thomas | 123/305 |
| 6,010,544 | A * | 1/2000 | Haldeman et al. | 44/301 |
| 6,032,652 | A * | 3/2000 | Nozawa et al. | 123/478 |
| 6,463,907 | B1 * | 10/2002 | Hiltner | 123/304 |
| 6,550,430 | B1 * | 4/2003 | Gray | 123/27 GE |
| 6,557,520 | B1 * | 5/2003 | Roberts, Jr. | 123/276 |
| 6,604,695 | B1 * | 8/2003 | Parish | 239/533.2 |
| 6,640,754 | B1 * | 11/2003 | Iida | 123/27 R |
| 6,640,773 | B1 * | 11/2003 | Ancimer et al. | 123/299 |

FOREIGN PATENT DOCUMENTS

WO    WO 9810179 A2 * 3/1998

OTHER PUBLICATIONS

G. Prakash, A. Ramesh, A. Basha Shaik, *An Approach for Estimation of Ignition Delay in a Dual Fuel Engine*, SAE Technical Paper XP002274530 (Jan. 3, 1999).

* cited by examiner

MULTI-FUEL COMPRESSION IGNITION ENGINE

CROSS REFERENCE TO RELATED APPLICATION

This application is a continuation-in-part of U.S. patent application Ser. No. 09/791,195; filed Feb. 23, 2001 now U.S. Pat. No. 6,598,584, that is entitled Gas-Fueled, Compression Ignition Engine with Maximized Pilot Ignition Intensity, the entire disclosure of which is incorporated herein by reference.

BACKGROUND OF THE INVENTION

1. Field of the Invention

The present invention relates generally to multi-fuel engines and, more specifically, to a compression ignition engine powered at least partially by a first fuel pilot ignited by a second fuel having a lower auto-ignition temperature.

2. Discussion of the Related Art

Recent years have seen an increased demand for the use of gaseous fuels as a primary fuel source in compression ignition engines. Gaseous fuels such as propane or natural gas are considered by many to be superior to diesel fuel and the like because gaseous fuels are generally less expensive, and when used in compression ignition engines, provide equal or greater power with equal or better fuel economy, and produce significantly lower emissions. This last benefit renders gaseous fuels particularly attractive because recently enacted and pending worldwide regulations may tend to prohibit the use of diesel fuel as the primary fuel source in many engines. The attractiveness of gaseous fuels is further enhanced by the fact that existing compression ignition engine designs can be readily adapted to burn these gaseous fuels.

One drawback of gaseous fuels is that they exhibit significantly higher ignition threshold temperatures than do diesel fuel, lubricating oil, and other liquid fuels traditionally used in compression ignition engines. The compression temperature of the gas and air mixture is insufficient during operation of standard compression ignition engines for autoignition. This problem can be overcome by igniting the gaseous fuel with a spark plug or the like. It can also be overcome by injecting limited quantities of a pilot fuel, typically diesel fuel, into each combustion chamber of the engine in the presence of a homogenous gaseous fuel/air mixture. The pilot fuel ignites after injection and burns at a high enough temperature to ignite the gaseous fuel charge by homogenous charge compression ignition (HCCI). Pilot-ignited, compression ignition, gas-fueled engines are sometimes called "dual fuel" engines, particularly if they are configured to run either on diesel fuel alone or on a combination of diesel fuel and a gaseous fuel. They are often sometimes referred to as MicroPilot® engines (MicroPilot is a registered trademark of Clean Air Power, Inc. of San Diego, Calif.), particularly if the pilot fuel injectors are too small to permit the use of the engine in diesel-only mode. The typical true "dual fuel" engine uses a pilot charge of 6 to 10% of maximum fuel rate. This percentage of pilot fuel can be reduced to 1% of maximum, or even less, in a MicroPilot® engine. As applied to gas-fueled engines, the invention applies to true dual fuel engines, MicroPilot® engines, and other pilot-ignited, compression ignition, gas-fueled engines as well. It will be referred to simply as a "dual fuel engine" for the sake of convenience.

A disadvantage of dual fuel engines over spark-ignited engines is the potential generation of increased quantities of oxides of Nitrogen ($NO_X$) resulting from sub-maximum ignition intensity of the pilot fuel charge and resultant less than optimal combustion of the pilot and gas fuel charges. The inventors theorize that less than maximum ignition intensity results from failing to time pilot fuel autoignition to at least generally occur after optimal penetration, distribution, and vaporization of the pilot fuel charge in the gas/air mixture. If autoignition (defined as the timing of initiation of pilot fuel combustion) occurs too soon after pilot fuel injection, the pilot fuel will be heavily concentrated near the injector because it has not yet time to spread throughout the combustion chamber. As a result, overly rich air/fuel mixtures are combusted near the injector, while overly lean mixtures are combusted away from the injector. Conversely, if autoignition occurs too long after pilot fuel injection, excessive pilot fuel vaporization will occur, resulting in misfire.

Moreover, premixed combustion of the pilot fuel, i.e., combustion occurring after the fuel mixes with air, provides greater ignition intensity than diffusion combustion, i.e., combustion occurring immediately upon injection into the combustion chamber and before the fuel mixes with air. Maximizing pre-mixed combustion of pilot fuel is enhanced by retarding autoignition to give the pilot fuel an opportunity to thoroughly mix with the air and form a homogeneous gas/pilot/air mixture. However, retarding autoignition timing is usually considered undesirable in diesel engine technology. In fact, it is almost universally agreed that optimum combustion in a conventional compression ignition diesel engine is achieved with the shortest possible ignition delay, and it is generally preferred that the ignition delay period should always be much shorter than the injection duration in order avoid an excessive rate of pressure rise, high peak pressure, and excessive $NO_X$ emissions. (See, e.g., SAE, Paper No. 870344, Factors That Affect BSFC and Emissions for Diesel Engines: Part II Experimental Confirmation of Concepts Presented in Part I, page 15). Conventional dual fuel engines, however, do not allow sufficient mixing time to maximize ignition intensity by igniting a pilot charge that is largely pre-mixed.

The need has therefore arisen to maximize the ignition intensity of a dual fuel charge.

HCCI offers an attractive alternative to traditional diesel engines because it has no throttling losses. Unlike in conventional compression ignition engines, combustion occurs simultaneously throughout the cylinder volume rather than as a flame front. However, heretofore, HCCI research has focused on the use of a gaseous fuel as the primary fuel. Minimum research has been done with respect to an HCCI engine having liquid fuel as the primary fuel due to difficulties associated with the HCCI combustion of liquid fuel. For instance, it is difficult to introduce a liquid fuel in a vapor state and to homogenously mix it with air. In addition, because both the primary fuel and the pilot fuel are in liquid form, both fuels will ignite at the same time unless the fuels are carefully selected to have different autoignition temperatures.

The problem of obtaining a homogenous mixture of a liquid fuel in air extends beyond HCCI engines to other systems in which it would otherwise be desirable to combust a homogenous charge of a liquid fuel and air.

The need has therefore arisen to enable practical HCCI combustion of a liquid primary fuel.

The need has additionally arisen to effectively vaporize a liquid fuel to permit the homogenous mixing of the liquid fuel with air.

SUMMARY OF THE INVENTION

It has been discovered that the relationship between ignition delay and injection duration is an important consideration when pilot injection is optimized for achieving the most intense ignition. The best performance is achieved when the fuel and combustion environment are controlled such that the duration of injection of pilot fuel is less than the ignition delay period (defined as the time between start of pilot fuel injection and the start of pilot fuel autoignition). Stated another way, the best performance is obtained when the ratio $Dp/Di<1$, where $Dp$ is the injection period and $Di$ is the ignition delay period. It is believed that the pilot spray becomes thoroughly pre-mixed during the mixing period $Dm$ occurring between the end of pilot fuel injection and the beginning of autoignition, $Ti$. This thorough premixing leads to maximized ignition intensity and dramatically reduced emissions. Hence, the inventors have surprisingly discovered that improved results stem from proceeding directly away from the conventional wisdom of providing an ignition delay period that is shorter than the injection duration period. However, in the preferred embodiment, the mixing period $Dm$ preferably should be controlled to also be sufficiently short to avoid misfire.

In accordance with another aspect of the invention, a method is provided for the homogenous charge compression ignition (HCCI) of a liquid fuel using a liquid pilot to initiate the autoignition process. In order to prevent simultaneous combustion of the pilot and primary fuel charges, the pilot fuel preferably has a relatively narrow boiling point temperature range and a substantially lower autoignition temperature than the primary fuel. The primary fuel may comprise, for instance, Dimethyl Ether (DME), ethanol or methanol. The pilot fuel may, for example, comprise diesel fuel.

The primary fuel preferably is supplied in a homogenous charge to obtain HCCI of the liquid fuel. To make this possible, the primary fuel is supplied in the form of finely atomized droplets having a mean diameter of less than about 50 microns, and more preferably less than about 30 microns, and even more preferably between about 5 microns and 20 microns. Droplets of this size can be obtained by injecting the fuel into the intake air stream via a fogging nozzle such as one having an impaction device against which the injected fuel impinges. Fuel quantity can be metered by one or more of regulating fuel supply pressure, pulse width modulation of fuel flow to the nozzle(s), selectively disabling selected nozzles, and varying the diameter of the nozzle(s).

BRIEF DESCRIPTION OF THE DRAWINGS

Preferred exemplary embodiments of the invention are illustrated in the accompanying drawings, in which like reference numerals represent like parts throughout and in which.

Figure 1:
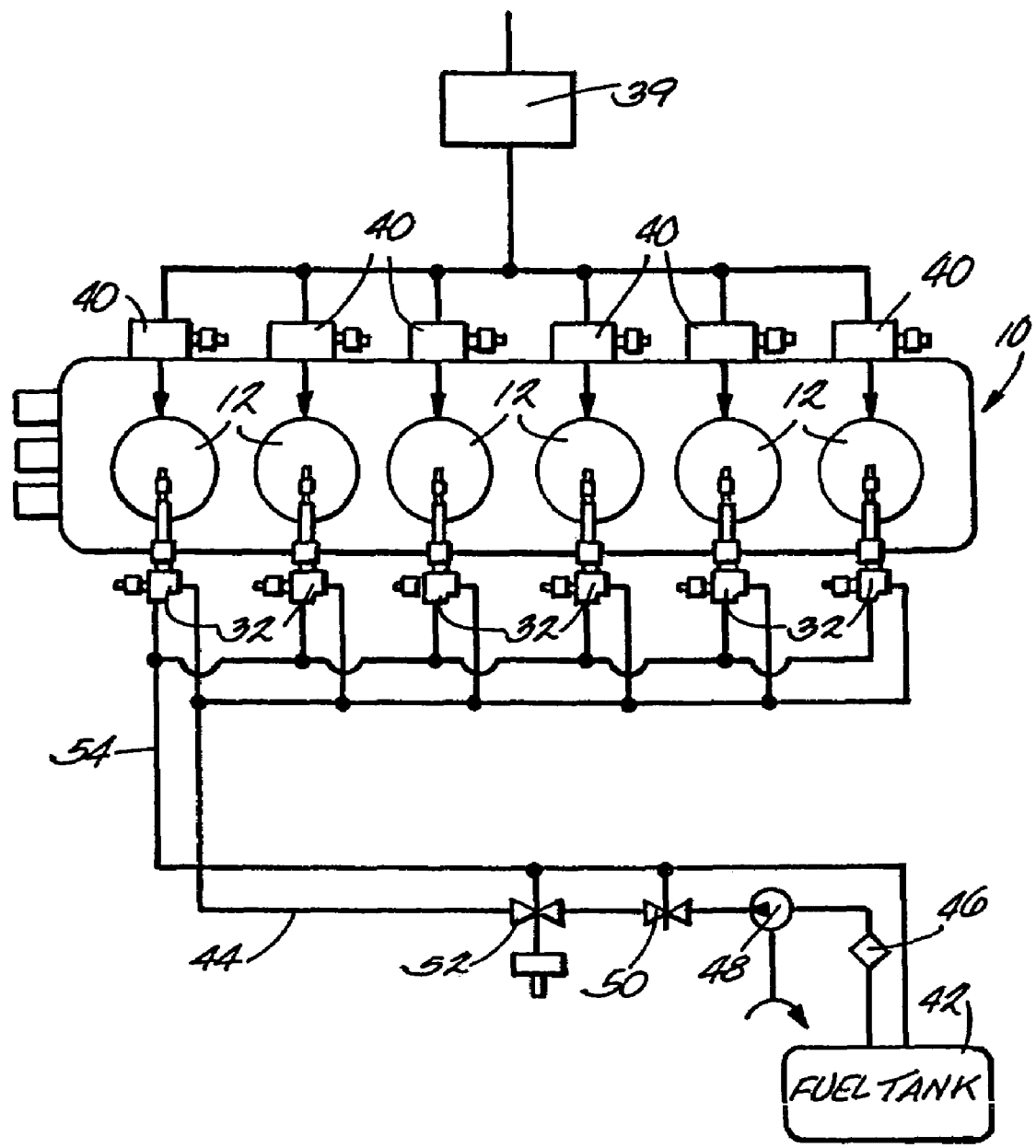
FIG. 1 schematically illustrates the fuel supply systems of a first embodiment of an internal combustion engine on which the inventive ignition intensity maximization control scheme can be implemented and which is suited for the HCCI of a gaseous primary fuel.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

1. Resume

Pursuant to the invention, pilot fuel injection and/or ignition are controlled in a pilot ignited compression ignition engine so as to maintain a relationship Dp/Di of <1, where Dp is the duration of the pilot fuel injection event and Di is the ignition delay period, as measured from the start of initiation of pilot fuel injection (Tp) to the start of pilot fuel autoignition (Ti). Although this control proceeds contrary to conventional wisdom, the inventors have discovered that the mixing period (Dm) resulting from maintaining an ignition delay period that is longer than an injection period maximizes ignition intensity by permitting the injected pilot fuel to become thoroughly distributed through and mixed with the second fuel in the combustion chamber prior to ignition. This, in turn, results in improved premixed burning of a nearly homogeneous mixture of the pilot fuel, the second fuel, and air and dramatically reduced NOx emissions. The second fuel may be either a gaseous fuel or a liquid fuel. In either case, the pilot fuel should have a narrower band boiling point temperature range and lower autoignition temperature than the second fuel. In addition, whether the primary fuel is in gaseous or liquid form, fuel supply is preferably controlled to obtain HCCI combustion in the combustion chamber. In the case of a liquid fuel, the homogenous charge can be obtained by injecting liquid fuel in the form of millions of finely atomized droplets having a mean diameter in the micron range.

2. System Overview a. Basic Engine Design of Pilot Ignited Gaseous Fueled Engine Turning now to the drawings and initially to FIGS. 1–3 in particular, a first engine 10 on which the invention can be implemented is illustrated. Engine 10 is a pilot ignited, gaseous fuel engine having a plurality of cylinders 12 each capped with a cylinder head 14 (FIG. 3). As is also shown in FIG. 3, a piston 16 is slidably disposed in the bore of each cylinder 12 to define a combustion chamber 18 between the cylinder head 14 and the piston 16. Piston 16 is also connected to a crankshaft 20 in a conventional manner. Conventional inlet and exhaust valves 22 and 24 are provided at the end of respective passages 26 and 28 in the cylinder head 14 and are actuated by a standard cam shaft 30 so as to control the supply of an air/fuel mixture to and the exhaust of combustion products from the combustion chamber 18. Gases are supplied to and exhausted from engine 10 via an intake air manifold 34 and an exhaust manifold 35, respectively. However, unlike in conventional spark ignited gas fueled engines, a throttle valve which would normally be present in the intake manifold 34 is absent or at least disabled, thereby producing an "unthrottled" engine. An intake air control system may also be provided for reasons detailed below.

b. Air and Fuel Delivery Systems

Gaseous fuel (e.g., compressed natural gas (CNG), liquefied natural gas (LNG) or propane) could be supplied via a single metering valve discharging into a mixing body at the entrance of the manifold 34, or via a similarly-situated mechanically controlled valve. In the illustrated embodiment, however, a separate injector 40 is provided for each cylinder 12. Each injector 40 receives natural gas, propane, or another gaseous fuel from a common tank 39 and a manifold 36 and injects fuel directly into the inlet port 26 of the associated cylinder 12 via a line 41.

The engine 10 is supplied with pilot fuel with multiple electronically controlled liquid fuel injector assemblies 32. Each pilot fuel injector assembly 32 could comprise any electronically controlled injector and an associated actuator. Examples of suitable injectors are (1) a pressure-intensified accumulator-type hydraulic electronic unit injector of the type disclosed in U.S. Reissue Pat. No. 33,270 and U.S. Pat. No. 5,392,745, and (2) a pressure-intensified non-accumulator type hydraulic electronic fuel injector of the type disclosed in U.S. Pat. No. 5,191,867, the disclosures of all of which are hereby incorporated by reference in their entirety, or a high pressure common rail system. The preferred injector assembly is a so-called OSKA-ECIS injector assembly, described below.

Referring to FIGS. 1 and 3, injector assembly 32 is fed with fuel from a conventional tank 42 via a supply line or common rail 44. Disposed in line 44 are a filter 46, a pump 48, a high pressure relief valve 50, and a pressure regulator 52. A return line 54 also leads from the injector 32 to the tank 42. The fuel may be any fuel suitable for use in a compression-ignition engine. Diesel fuel is most commonly used for pilot fuel in dual fuel engines of the disclosed type. However, engine lubricating oil may also be used. Engine lubricating oil is particularly attractive in MicroPilot® applications because those applications require such small quantities of pilot fuel (typically comprising, on average, no more than about 1% of the total fuel charge supplied to the combustion chamber) that the lubricating oil can be replenished continuously, keeping the oil fresh and obviating the need for oil changes.

Gaseous fuel could be supplied via a single metering valve discharging into a single throttle body at the entrance of the manifold 34, or via a similarly-situated mechanically controlled valve. In the illustrated embodiment, however, a separate injector 40 is provided for each cylinder 12. Each injector 40 receives natural gas, propane, or another gaseous fuel from a common tank 39 and a manifold 36 and injects fuel directly into the inlet port 26 of the associated cylinder 12 via a line 41.

Figure 2:
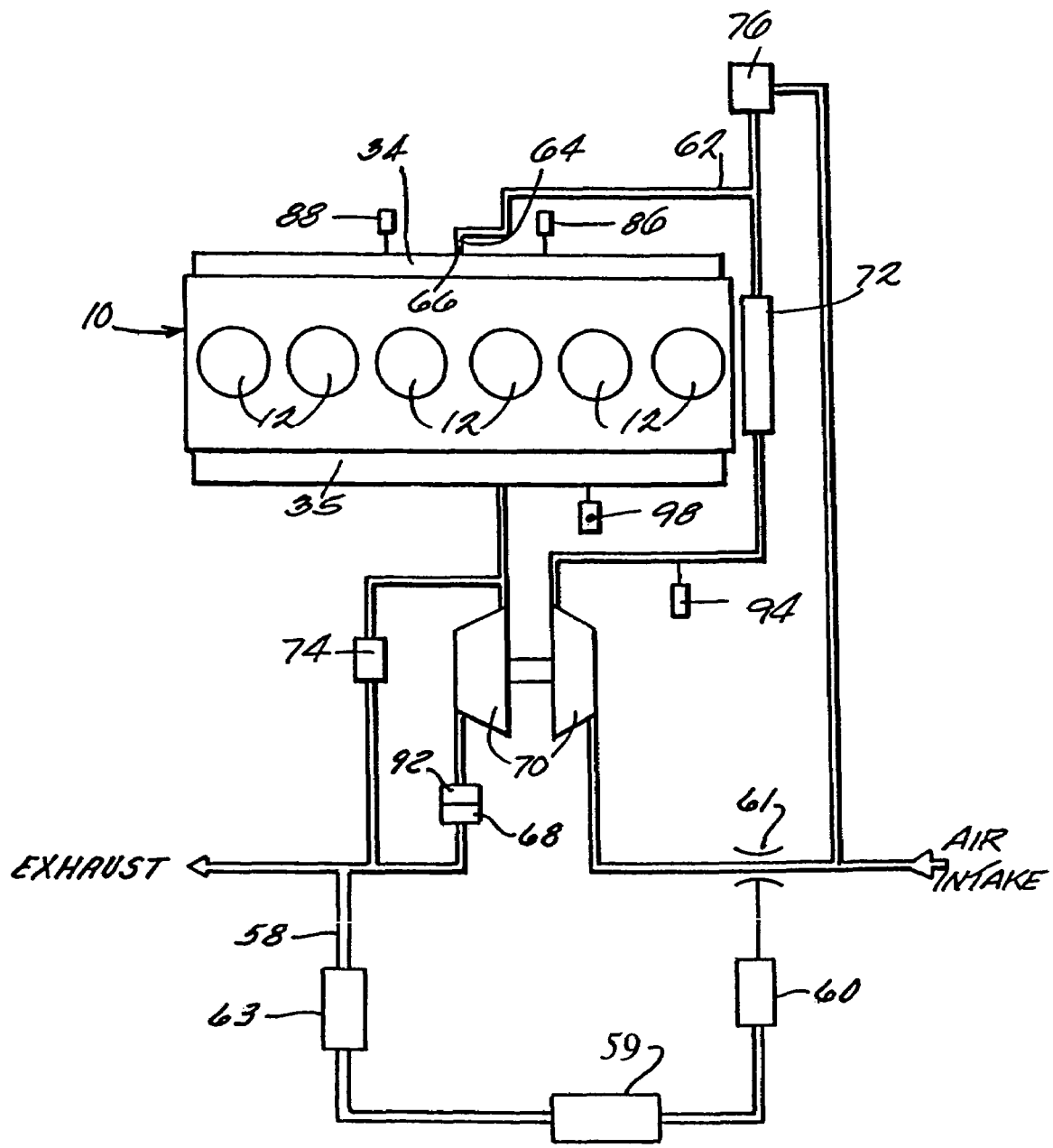
FIG. 2 schematically illustrates the combustion airflow control systems of the engine of FIG. 1.
Figure 3:
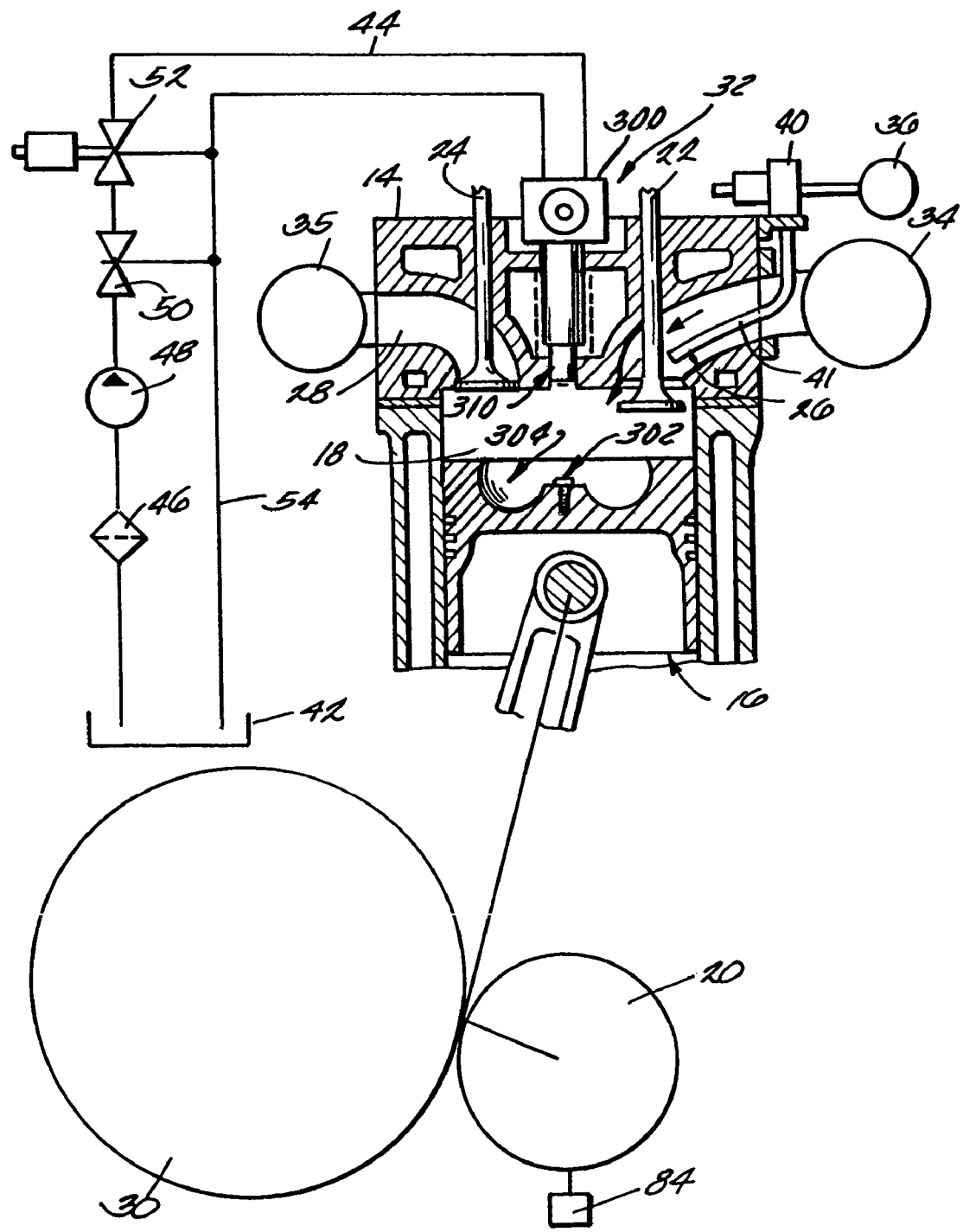
FIG. 3 is a partially schematic sectional side elevation view of a portion of the engine of FIGS. 1 and 2.

Referring to FIG. 2, the air intake control system may include (1) an exhaust gas recirculation (EGR) subsystem permitting recirculated exhaust gases (EGR) to flow from an exhaust manifold 35 to the intake manifold 34 and/or filtered for removal of soot, (2) a turbocharging subsystem which charges non-EGR air admitted to the intake manifold 34. The EGR subsystem, which changes EGR and airflow, is useful for increasing ignition delay, diluting the charge, reducing the peak combustion temperature, and inhibiting the formation of $NO_X$ emissions. It includes (1) an EGR cooler 59 and an EGR metering valve 60 located in a return line 58 leading from the exhaust manifold 35 to the intake manifold 34. The line 58 may be connected to the exhaust line containing the wastegate 74 (detailed below) at its inlet end, and preferably empties into the air intake line at its outlet end with the aid of a mixing venturi 61. An EGR filter 63 is also located in the line 58, upstream of the EGR cooler, to reduce diesel soot. A second line 62 leads from a turbo bypass valve 76 and back to the air inlet system. In addition, an exhaust back pressure (EBP) valve 68 having an adjustable flow-restricting metering orifice may be provided in the exhaust gas stream to control the exhaust gas absolute pressure (EGAP), hence varying EGR flow. Valve 68, if present, can be actuated by a controller 56 (FIG. 6) to adjust the percentage of EGR in the total charge admitted to intake port 66 without controlling valve 60.

As is further shown in FIG. 2, the turbocharging subsystem of the intake air control system includes a turbocharger 70 and an aftercooler 72 provided in line 62 upstream of the valve 60 and intake port 66. Operation of the turbocharger 70 is controlled in a conventional manner by a wastegate 74 and a turbo bypass valve 76, both of which are electronically coupled to the controller 56 (detailed below). Other intake airflow modification devices, such as a supercharger, a turbo-air bypass valve, or EGR modification devices, such as an expansion turbine or an aftercooler, may be employed as well. Examples of ways in which these devices may be operated to adjust engine operating parameters such as air charge temperature (ACT), excess air ratio (lambda), and manifold absolute pressure are provided in co-pending and commonly assigned U.S. patent application Ser. No. 08/991,413 (the '413 application) and entitled Optimum Lambda Control for Compression Ignition Engines, filed in the name of Beck et al. The disclosure of the '413 application is incorporated by reference by way of background information.

c. OSKA-ECIS Fuel Injector Assembly

The OSKA-ECIS fuel injector assembly 32 utilized in the preferred and illustrated embodiment of the invention, comprises 1) a high discharge coefficient injector 300, 2) a so-called OSKA infringement target 302, and 3) a toroidal chamber 304 located in a cavity in the upper surface 360 of the piston 16. The injector 300 discharges a high-velocity stream at a rapidly falling rate so as to provide an Expanding Cloud Injection Spray (ECIS). The injected stream of fuel impinges against the target 302, which breaks the fuel droplets into smaller droplets and reflects the fuel into the toroidal chamber 304 as a dispersed, vaporized spray. The spray then swirls through the toroidal chamber 304 in a highly turbulent manner so as to maximize the rate of penetration, distribution, vaporization, and mixing with the air/fuel mixture in the chamber 18.

Figure 6:
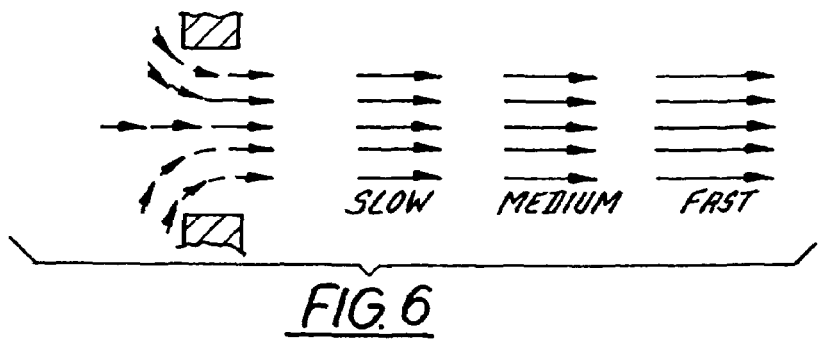
FIG. 6 graphically illustrates the dispensing of a jet spray from an ECIS-type fuel injector.

The injector 300 is preferably an accumulator type injector such as the ones described, e.g., in U.S. Reissue Pat. No. 33,270 and in U.S. Pat. No. 5,392,745, the disclosures of both of which are incorporated by reference. In an accumulator type fuel injector, the injection pressure falls from an initial peak as a square function, and the injection velocity falls as a square root function of pressure. Hence, the velocity falls essentially as a straight-line function during the injection event. Stated another way, because all or nearly all of the pilot mass is injected at a uniformly falling rate, each successive mass of droplets ejected from the nozzle moves slower than the mass before it, and the droplets therefore do not have the opportunity to accumulate. This effect is illustrated in the diagram of FIG. 6, which shows the separation resulting from a rapidly falling injection velocity or $-dU_j/dt$.

Also as discussed in the '745 patent, the ECIS effect can be enhanced by utilizing a nozzle in the injector that has a relatively high discharge coefficient when compared, e.g., to a conventional valve-covers-orifice (VCO) nozzle. A hollow nozzle having a single, relatively large discharge orifice pointed directly at the target 302 would suffice. The preferred nozzle 310, however, is a so-called bottom-seated pintle nozzle of the type described, e.g., in U.S. Pat. No. 5,853,124, the subject matter of which is incorporated by reference. In that type of nozzle, a negative interference angle is formed between a conical tip of the needle and the mating conical valve seats so that the needle seat is located at the bottom of the valve seat rather than at the top. The resulting nozzle lacks any velocity drop downstream of the needle seat, even at very low needle lifts, so that virtually all of the energy used to pressurize the fuel is converted to kinetic energy. Spray dispersion and penetration at low needle lifts therefore are significantly enhanced.

Referring to FIGS. 3–5a, the pintle nozzle 310 includes a nozzle body 312 in which is housed a needle valve assembly that includes a nozzle needle 314 and a valve seat 316. The nozzle needle 314 is slidably received in a bore 318 extending axially upwardly into the nozzle body 312 from the valve seat 316. A pressure chamber 319 is formed around the lower portion of the nozzle needle 314 and is coupled to the fuel source 42 by a fuel inlet passage (not shown) and the inlet line 44. The lower end of the needle 314 forms a tip 328. The upper end of the nozzle needle 314 is connected to a needle stem (not shown) that in turn is guided by a bushing or other needle guide (also not shown) for concentric movement with the bore 318. The nozzle needle 314 is biased downwardly towards the valve seat 316 by a return spring (also not shown) acting on an upper surface of the needle guide. A relatively short cylindrical passage 324 is formed in the nozzle body 312 beneath the valve seat 316 and opens into a bottom surface 326 of the nozzle body 312 for purposes detailed below.

Figure 5:
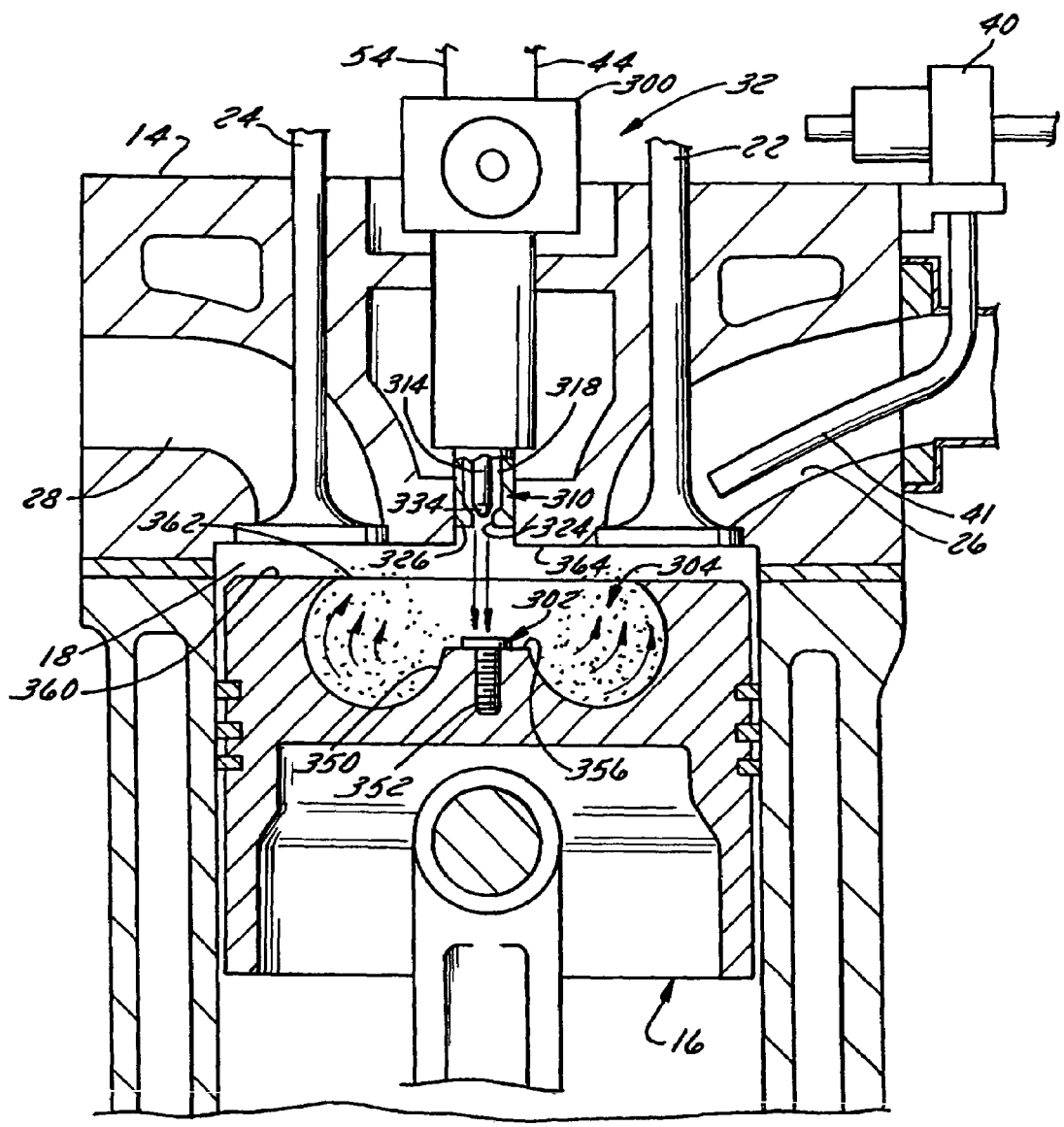
FIG. 5 corresponds to FIG. 4 but shows the injector in its open position.
Figure 5A:
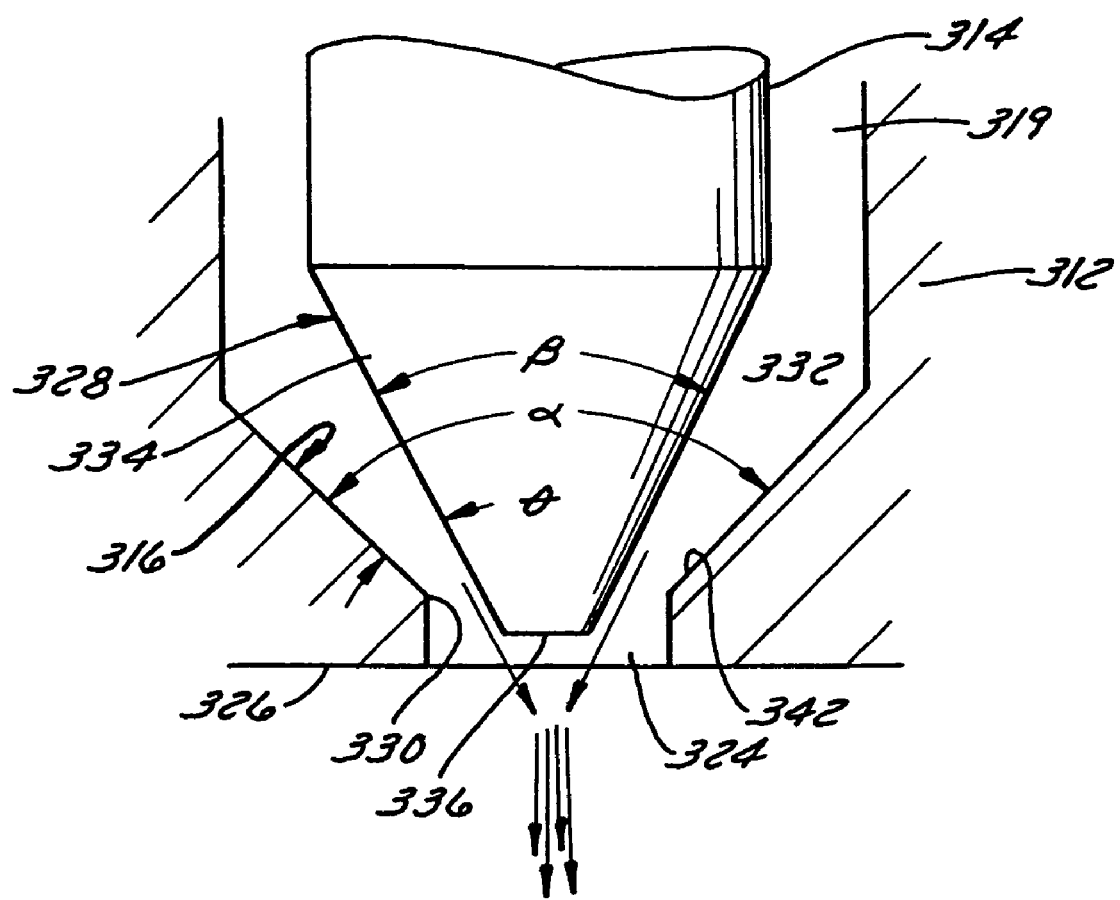
FIG. 5a is an enlarged view of a portion of a nozzle of the fuel injector assembly of FIG. 5.

Referring to FIG. 5a, the valve seat 316, which typically is machined directly into the nozzle body 312 and forms the bottom end portion of the bore 318, terminates in a seat orifice 330. The needle tip 328 is configured to selectively 1) seat on the valve seat 316 to prevent injection and 2) lift from the valve seat 316 to permit injection. A discharge passage 332 is formed between the valve seat 316 and the needle tip 328 when the needle tip 328 is in its lifted position of FIGS. 5 and 5a to permit fuel to flow from the pressure chamber 319, through the discharge passage 332, and out of the injection valve assembly 32 through the seat orifice 330. The valve seat 316 and at least a portion of the needle tip 328 that seals against the valve seat 316 are generally conical or frusto-conical in shape (the term conical as used herein encompassing structures taking the shape of a right angle cone as well as other structures that decrease in cross sectional area from upper to lower ends thereof).

The needle tip 328 includes a frusto-conical portion 334 for engagement with the valve seat 316 and terminates in a bottom surface 336. The frusto-conical portion 334 is longer than the valve seat 316 but could be considerably shorter or even could take some other shape so long as it is configured relative to the valve seat 16 to be "bottom seating" as that term is defined below. The bottom surface 336 of the needle tip 328 remains recessed within the cylinder head 14, even when the injector 300 is in its closed position of FIG. 4, to protect the needle tip 328 from the hot gases in the combustion chamber 18. In order to produce a concentrated "laser" stream configured to impinge on the target 302 with maximum force, the nozzle 300 terminates in a so-called zero degree pintle tip, lacking any structure that extends beneath the conical valve seat 316 when the needle tip 328 is in its closed or seated position. It has been found that, in a zero degree pintle tip, spray from the zero degree pintle nozzle takes the form of a pencil-thin jet.

In the preferred and illustrated embodiment, the pintle nozzle 300 is a so-called unthrottled pintle nozzle in which the area of the gap formed between the pintle 336 and the peripheral surface of the cylindrical passage 324 is always larger than the effective area of the seat orifice 330 so that minimum flow restriction takes place downstream of the valve seat 326. This configuration assures that fuel is discharged from the nozzle 300 at the maximum velocity—an important consideration at low needle lifts and small fuel injection quantities.

The included angle a of the valve seat cone and the included angle β of the needle tip cone usually are different so that an included interference angle θ is formed therebetween in order to assure seating at a distinct needle seat that extends only part way along the length of the valve seat 316 and that theoretically comprises line contact. The interference angle θ is set to be negative so that the conical portion 334 of the needle tip 328 seats against a needle seat 342 located at the bottom end of the valve seat 316 at a location at or closely adjacent to the seat orifice 330, hence producing a bottom seated pintle nozzle. As a result, the cross-sectional area of the passage 332 increases continuously from the seat orifice 330 to its upper end. The interference angle θ should be set sufficiently large so that seating at the desired location at the bottom of the valve seat 316 is achieved, but must be set sufficiently small so to distribute the impact forces occurring upon needle closure sufficiently to avoid undue impact stresses on the needle tip 328 and valve seat 316. Preferably, the interference angle θ should range between 0.5° and 2°, and it most preferably should be set at about 1°.

Figure 4:
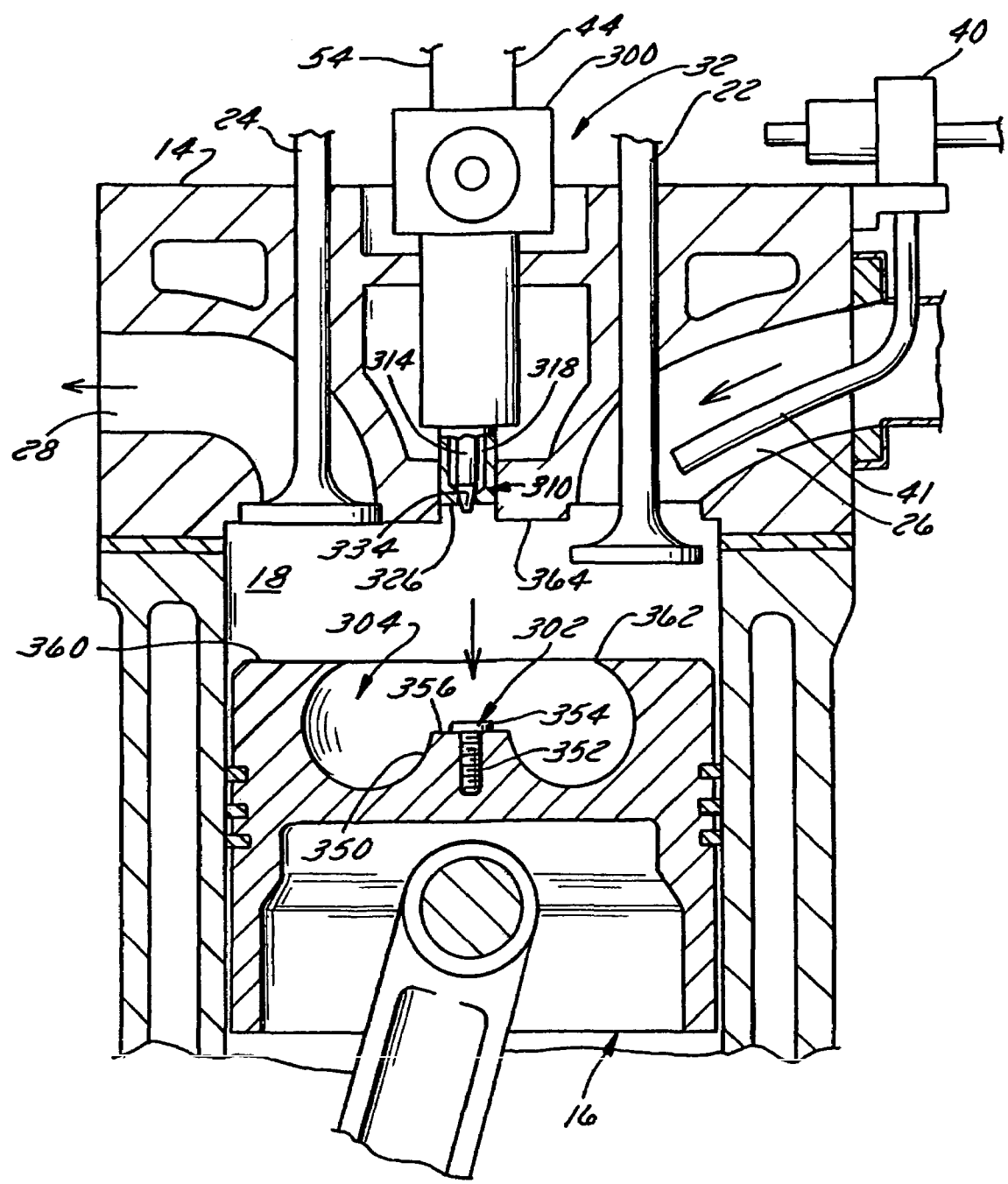
FIG. 4 is a somewhat schematic, partially sectional, side elevation view of a pilot fuel injector assembly usable in the engine of FIGS. 1–3 and showing the injector in its closed position.

In operation, the nozzle needle 314 of the nozzle 310 is normally forced into its closed or seated position as seen in FIG. 4 by the return spring (not shown). When it is desired to initiate an injection event, fuel is admitted into the pressure chamber 319 from the fuel inlet passage 320. When the lifting forces imposed on the needle 314 by the pressurized fuel in the pressure chamber 319 overcome the closing forces imposed by the spring and decaying fluid pressure in the accumulator injector's control cavity, the nozzle needle 314 lifts to permit fuel to flow through the discharge passage 332, past the needle seat 342, out of the seat orifice 330, and then out of the nozzle 310. The nozzle needle 314 closes to terminate the injection event when the fuel pressure in the pressure chamber 319 decays sufficiently to cause the resulting lifting forces drop to beneath the closing force imposed on the needle 314 by the return spring.

The flow area at the top of the discharge passage of a conventional top seating pintle (TSP) is less than the area at the seat orifice for needle lift values of 0.0 to 0.035 mm. On the other hand, the flow area of the discharge passage of the bottom seating pintle (BSP) 300 is less at the seat orifice 330 than at the top of the discharge passage 332 for all values of at needle lift. The laws of continuity or flow consequently dictate that the flow velocity at the seat orifice 330 of the BSP will be less than that at the upper end of the discharge passage by an amount proportional to the difference in flow area at the seat orifice 330 as compared to that at the upper end of the discharge passage 332. For example, at a needle lift of 0.005 mm, the flow area at the top of the discharge passage of a TSP nozzle is 0.0125 mm², and the area at the bottom of the passage is 0.025 mm², or a ratio of 0.5:1.0. This difference may seem inconsequential at first glance. However, considering that, at the same needle lift and flow rate, the flow area of the nozzle 300 is 0.045 mm² at the top of the discharge passage 332 and 0.0125 mm at the bottom, i.e., at the seat orifice 330. The spray velocity at the outlet or seat orifice of the bottom seated pintle nozzle therefore will be twice that of the top seated pintle nozzle at the same needle lift due to the converging flow area of the discharge passage 332 of the BSP 300. Since the kinetic energy of the spray is proportional to the square of the velocity, the spray energy of the BSP 300 will be four times that of a comparable top seated pintle at the same needle lift and volumetric flow rate. This, in turn, permits rapid mixing and vaporization of the injected fuel.

Figure 7:
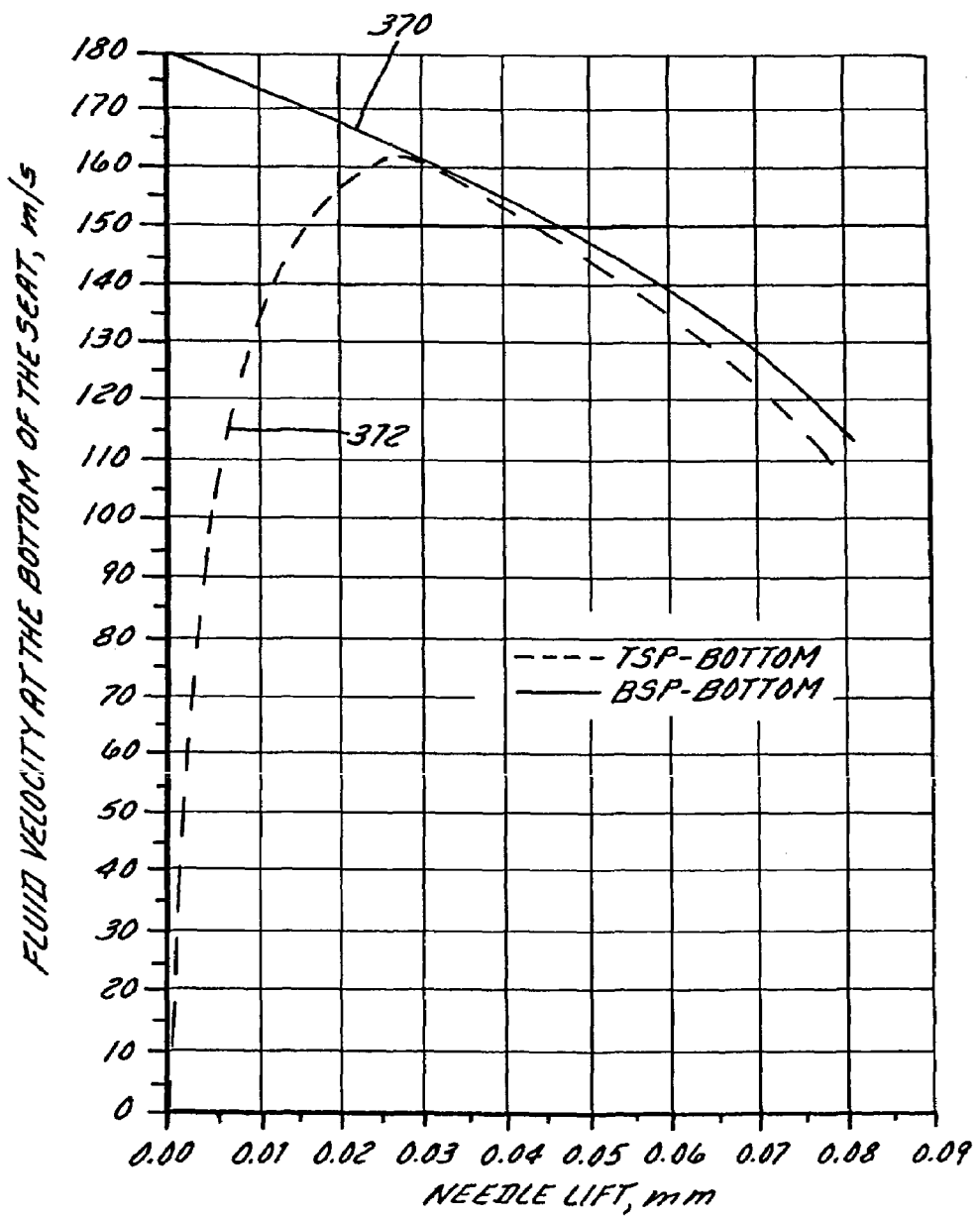
FIG. 7 is a graph of velocity versus needle lift at the bottom of the discharge passage for both a bottom seated pintle nozzle and a top seated pintle nozzle.

The import of this effect can be appreciated by the curves 370 and 372 in FIG. 7, which plot fluid velocity at the bottom of the discharge passage for both a BSP and a TSP. Particularly relevant are the curves which illustrate that, at needle lifts beneath about 0.03 mm, the velocity at the bottom of the discharge passage of the BSP is substantially higher than at the bottom of the discharge passage of the TSP. At a lift of 0.01 mm, the spray velocity of the BSP is 175 m/s vs. 121 m/s for the TSP, or an energy ratio of 2:1.

The enhanced velocity provided by the bottom seated pintle nozzle 300 produces a spray velocity at the seat orifice of twice that of a top seated pintle nozzle of otherwise similar configuration and operating under the same needle lift and injection pressure. This enhanced velocity provides a two-fold advantage in an OSKA-ECIS fuel injector and impingement target assembly. First, it permits the injection of a greater quantity of fuel per unit time, thereby permitting the use of a shorter Dp to inject a given volume of pilot fuel and, therefore, facilitates the achievement of Dp/Di on the order of 0.2 or less. Second, the impingement of the high velocity jet against the impingement target 302 maximizes spray energy and further enhances the enhanced mixing effects provided by the OSKA target 302, thereby further reducing Dm.

Referring again to FIGS. 4 and 5, the OSKA target 302 is generally of the type disclosed in U.S. Pat. No. 5,357,924, the subject matter of which is incorporated herein by reference. Target 302 is mounted on a platform 350 extending upwardly from the center of the toroidal chamber 304. The target 302 preferably comprises a flat-headed insert threaded or otherwise inserted into a bore 352 in the top of the platform 350. The insert is hardened when compared to the remainder of the cast metal piston 16 to mitigate against a tendency towards erosion. An upper surface 354 of the target 302 comprises a substantially flat collision surface for the incoming stream of injected fuel. An annular area 356, surrounding the target 302 and formed radially between the edge of the platform 350 and the target 302, serves as a transition area that promotes flow of reflected fuel into the toroidal chamber 304 in a manner that enhances the swirling motion provided by the toroidal shape of the chamber 304.

The chamber 304 is not truly toroidal because the top of the toroid is reduced by truncating an upper surface 360 of the piston 16. This truncation (1) provides the clearance volume and compression ratio required for a compression ignition engine, and (2) truncates an inner periphery 362 of the upper surface of the toroid to prevent the formation of a knife-edge, thereby rendering the piston's structure more robust. The degree of truncation is set to cause the upper surface 360 of the piston 16 to nearly contact the lowermost surface 364 of the cylinder head 14 at the piston's TDC position, thereby enhancing the so-called "squish mixing" effect that results when an air/fuel mixture is trapped between a very small gap between the uppermost surface 360 of the piston 16 and the lowermost surface 364 of the cylinder head 14.

The cross-section of the chamber 304 is set to provide a volume required to provide the engine's rated compression ratio. In an engine having a 16:1 compression ratio, the toroid cross-section has a diameter $D_{TOROID}$ that is about $0.25 \times D_{BORE}$, where $D_{BORE}$ is the diameter of the bore in which the piston is disposed. Hence, in the case of a 140 mm diameter bore, each toroid will have a diameter of 35 mm. The individual toroids of the chamber 304 will have a center-to-center spacing of 55 mm. Conversely, $D_{TOROID}$ would equal about $0.20\, D_{BORE}$ to obtain a 20:1 compression ratio, and about $0.30\, D_{BORE}$ to obtain a 12:1 compression ratio.

The general size and configuration of the nozzle 300, the target 302, and the chamber 304 are selected to achieve the desired Dp/Di reduction and Dm reduction effects while maximizing the desired ECIS effect. The ECIS effect is best achieved when the fuel is injected at a velocity in a range that falls from an initial peak velocity of about 200 to 250 m/s (preferably 230 m/s) to a final velocity of about 130 to 220 m/s (preferably 160 m/s). These effects are achieved by obtaining injection pressures from 20 to 30 mPa with a cylinder pressure of 5 to 10 mPa.

With these constraints in mind, it is found that the optimal injector and spray dimensions for a piston diameter of 140 mm and a pilot fuel quantity, $Q_{PILOT}$, of 2 mm$^3$ are approximately as follows:

TABLE 1

PREFERRED OSKA-ECIS INJECTOR CHARACTERISTICS

| System Characteristic | Preferred Range | Especially Preferred Value |
|---|---|---|
| Injector seat diameter | 0.35 mm to 0.70 mm | 0.5 mm |
| Needle lift | 0.05 mm to 0.15 mm | 0.1 mm |
| Spray diameter | 0.30 mm to 0.35 mm | 0.32 mm |

Because the OSKA target 302 will break up the spray droplets to sizes that are on the order of 5 to 10% of the incoming spray diameter, and because the droplets will travel a distance of about 500 to 1000 droplet diameters in an ECIS-type injection event, the resultant OSKA-ECIS injector assembly 32 will distribute the droplets in a space of 25 to 100 times the initial spray diameter or 8 to 32 mm as a first approximation. The resulting arrangement permits the maximization of fuel penetration, distribution, and vaporization during a minimized Dm, thus greatly facilitating Dp/Di and Dm minimization and facilitating the active control of these characteristics to optimize ignition intensity.

d. Electronic Control System

Figure 8:
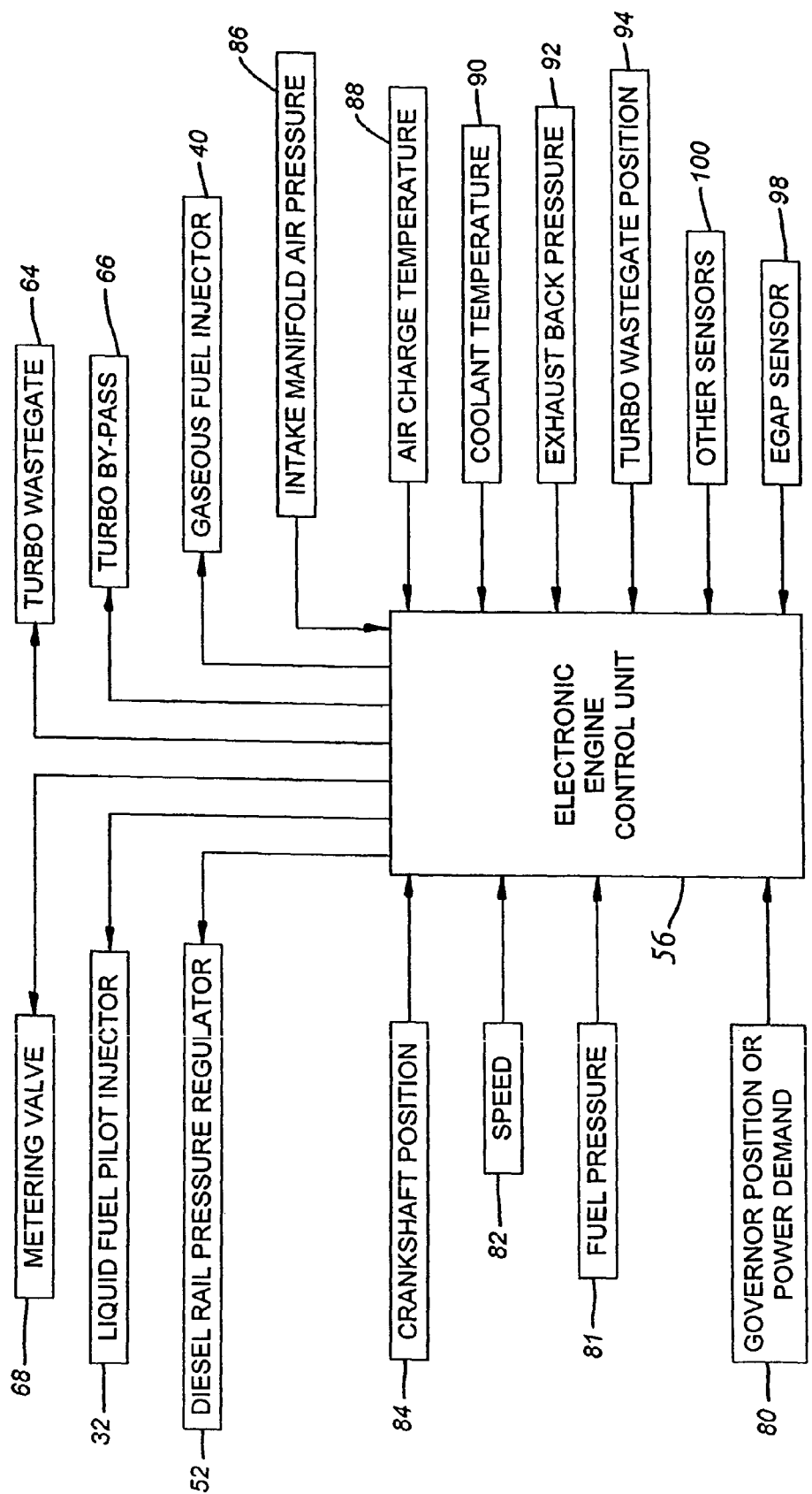
FIG. 8 schematically represents an electronic controller for the engine of FIGS. 1–3.

Referring to FIG. 8, the controller or electronic control unit (ECU) 56 may comprise any electronic device capable of monitoring engine operation and of controlling the supply of fuel and air to the engine 10. In the illustrated embodiment, this ECU 56 comprises a programmable digital microprocessor. Controller or ECU 56 receives signals from various sensors including a governor position or other power demand sensor 80, a fuel pressure sensor 81, an engine speed (RPM) sensor 82, a crank shaft angle sensor 84, an intake manifold absolute pressure (MAP) sensor 86, an intake manifold air charge temperature (ACT) sensor 88, an engine coolant temperature sensor 90, a sensor 92 measuring exhaust back pressure (EBP), and a sensor 94 monitoring the operation of the wastegate 74, respectively. The controller 56 also ascertains EGAP either directly from an EGAP sensor 98, or indirectly from the EBP sensor 92 (if EBP valve 68 is used). Other sensors used to control fuel injection are illustrated at 100 in FIG. 8. Other values, such as indicated mean effective pressure (IMEP) and the mass and quantity of gas ($Q_{GAS}$ and $V_{GAS}$, respectively) injected are calculated by the controller 56 using data from one or more of the sensors 80–100 and known mathematical relationships. Still other values, such as intake manifold absolute pressure (MAP), indicated mean effective pressure (IMEP), maximum engine speed (RPM), volumetric efficiency fuel quality, and various system constants are preferably stored in a ROM or other storage device of controller 56. Controller 56 manipulates these signals and transmits output signals for controlling the diesel rail pressure regulator 52, the pilot fuel injector assemblies 32, and the gas injectors 40, respectively. Similar signals are used to control the turbo wastegate 74, the turbo bypass 76, and the metering orifice or EBP valve 68, respectively.

3. Ignition Intensity Maximization a. Ignition Intensity Maximization Through Dp/Di Control i. Basic Theory Pursuant to a preferred embodiment of the invention, the controller 56 (1) receives the signals from the various sensors, (2) performs calculations based upon these signals to determine injection and/or combustion characteristics that maximize ignition intensity, and (3) adjusts the determined characteristic(s) accordingly. This control is preferably performed on a full time (i.e., cycle-by-cycle), full speed and load range basis. It may be either open loop or closed loop. Possible control schemes will now be described, it being understood that other control schemes are possible as well.

As discussed above, the key to ignition intensity maximization is to obtain a ratio Dp/Di of <1. Dp/Di can be varied by varying pilot fuel injection timing, Tp, pilot fuel injection duration, Dp, and/or autoignition timing, Ti. All three vary Dp/Di by varying a mixing period, Dm (where Dm=Di−Dp). Dm is that period between the ejection of the last droplets of the fuel charge from the injector and the initiation of autoignition. Hence, the ignition intensity can be maximized through optimization of Dm. This fact is confirmed by the graph of FIG. 9. The curve 110 of that graph plots NOx emissions vs. Dm for a Caterpillar Model 3406 engine running at 1800 RPM and full load at various values of Tp and Dm. Dm was adjusted by varying ignition timing, Ti. Dp was held constant and, since Ti was nearly constant at 6° c.a. and BTDC, Di is approximately equal to Tp−6° and Dm is approximately equal to Tp−12°.

Figure 9:
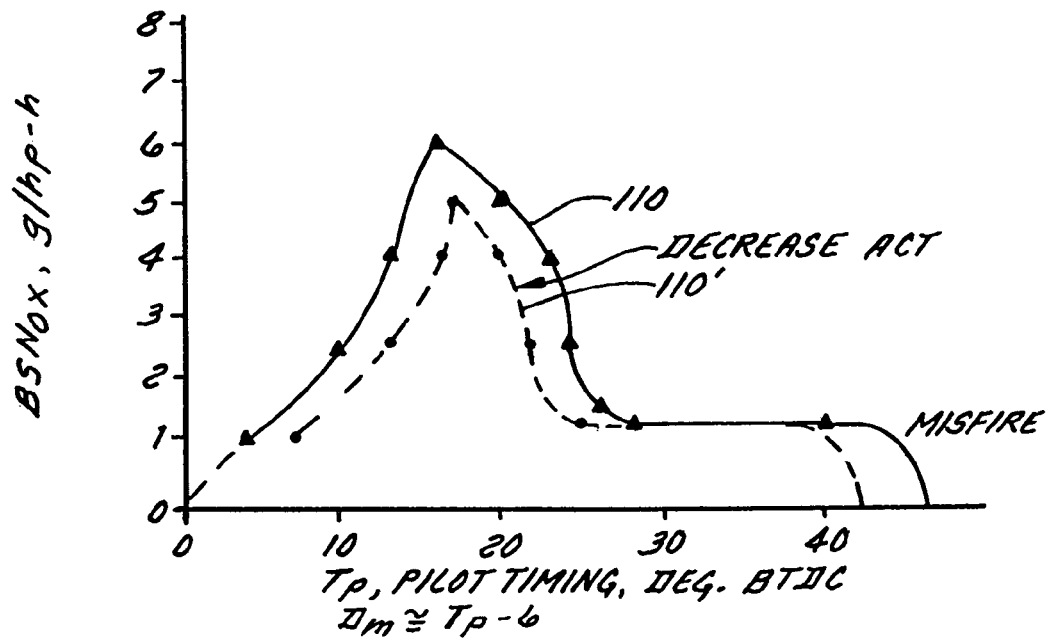
FIG. 9 is graph illustrating the effect of changes in ignition delay on $NO_X$ emissions under a particular set of engine operating conditions.

For the data in FIG. 9, curve 110, the range of Dp/Di runs from

Dp=6° c.a.

Tp=10–40° c.a.

Di=4–34°

Dm=0–28°

Dp/Pi=1.5–0.17

Dp/Di opt=6/22 to 6/36=0.27 to 0.17

The data used to produce FIG. 9 is reproduced below in Table 2:

TABLE 2

RELATIONSHIP BETWEEN BSNOx AND Dm,

| BSNOx g/hp - h | Dm, ° c.a., High ACT | Dm, ° c.a., Low ACT |
|---|---|---|
| 1.0 | 4 | 7 |
| 4.0 | 13 | 16 |
| 2.5 | 10 | 13 |
| 6.0 | 16 | 18 |
| 5.0 | 20 | 17 |
| 4.0 | 23 | 20 |
| 2.5 | 24 | 22 |
| 1.5 | 26 | 23 |
| 1.2 | 27–40 | 25 |

Actual data may vary. Curve 110' indicates what can be expected by using decreased ACT as a tool to adjust Di and Dp/Di. With decreased ACT or addition of EGR etc., Di is increased, providing a direct effect on increasing Dm and moving toward optimum Dp/Di and Dm.

Figure 10:
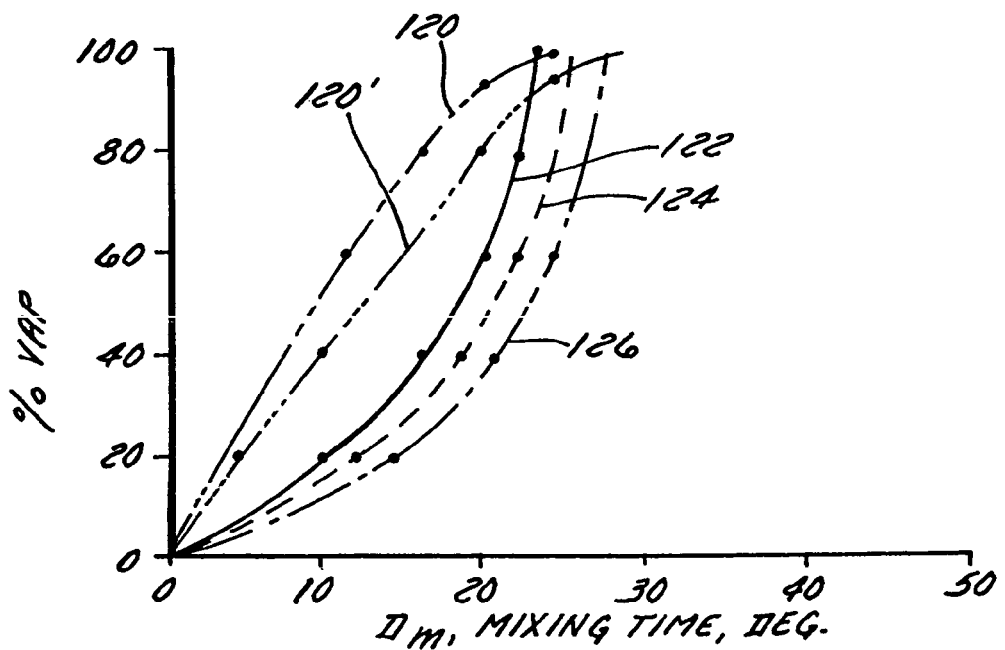
FIG. 10 is a set of graphs illustrating fuel penetration/distribution percentage and spray vaporization percentage vs. mixing period for various air charge temperatures (ACTs)

The above is only a representative example to show trends. Optimum Dm is not constant. It varies with several factors including engine speed, engine load, and ACT. Because the rate of fuel vaporization rises with temperature, the maximum desirable Dm varies inversely with ACT. That effect is demonstrated by FIG. 10, which plots 1) fuel penetration and distribution percentage and 2) fuel vaporization percentage for the above-described engine running at 1800 RPM and full load. Curve 120 demonstrates that, for all levels of ACT, the percentage of fuel penetration and distribution increases continuously up to essentially 100% after a Dm of about 25° c.a. Curve 120' indicates that the average penetration rate increases with a decrease in MAP. Fuel vaporization percentage increases more slowly at an average rate that increases with ACT (compare the low ACT curve 122 (i.e., ACT≈30° C.) to the medium ACT curve 124 (i.e., ACT≈ 50° C.) and the low ACT curve 126 (i.e., ACT≈70° C.). Ignition intensity maximization occurs when 1) both the percentages of fuel penetration and vaporization and the percentage of fuel vaporization exceeds at least about 50%, and preferably 75%, to obtain premixed burning, and 2) the percentage of fuel spray vaporization does not remain at 100% for more than about 10° c.a. (misfire may occur after that point). Using these parameters, it can be seen that optimum Dm ranges vary from 25 to 30° c.a. for low ACTs, to 20 to 25° c.a. for medium ACTs, to 18 to 23° for high ACTs. The data used to generate FIG. 10 I reproduced in Table 3:

TABLE 3

RELATINSHIP BETWEEN Dm AND VAPORIZATION AND PENETRATION AND DISTRIBUTION PERCENTAGES

| % Vaporization | Dm, °c.a., High ACT | Dm, °c.a., Medium ACT | Dm, °c.a., Low ACT | % Penetration and Distribution | Dm, °c.a., Normal MAP | Dm, °c.a., Decreased MAP |
|---|---|---|---|---|---|---|
| 20 | 10 | 12 | 14 | 20 | 3 | 4 |
| 40 | 17 | 19 | 21 | 40 | 8 | 10 |
| 60 | 20 | 22 | 24 | 60 | 11 | 15 |
| 80 | 22 | 24 | 26 | 80 | 16 | 20 |
| 100 | 23 | 25 | 27 | 95 | 20 | 24 |
|  |  |  |  | 100 | 24 | 28 |

Figure 11:
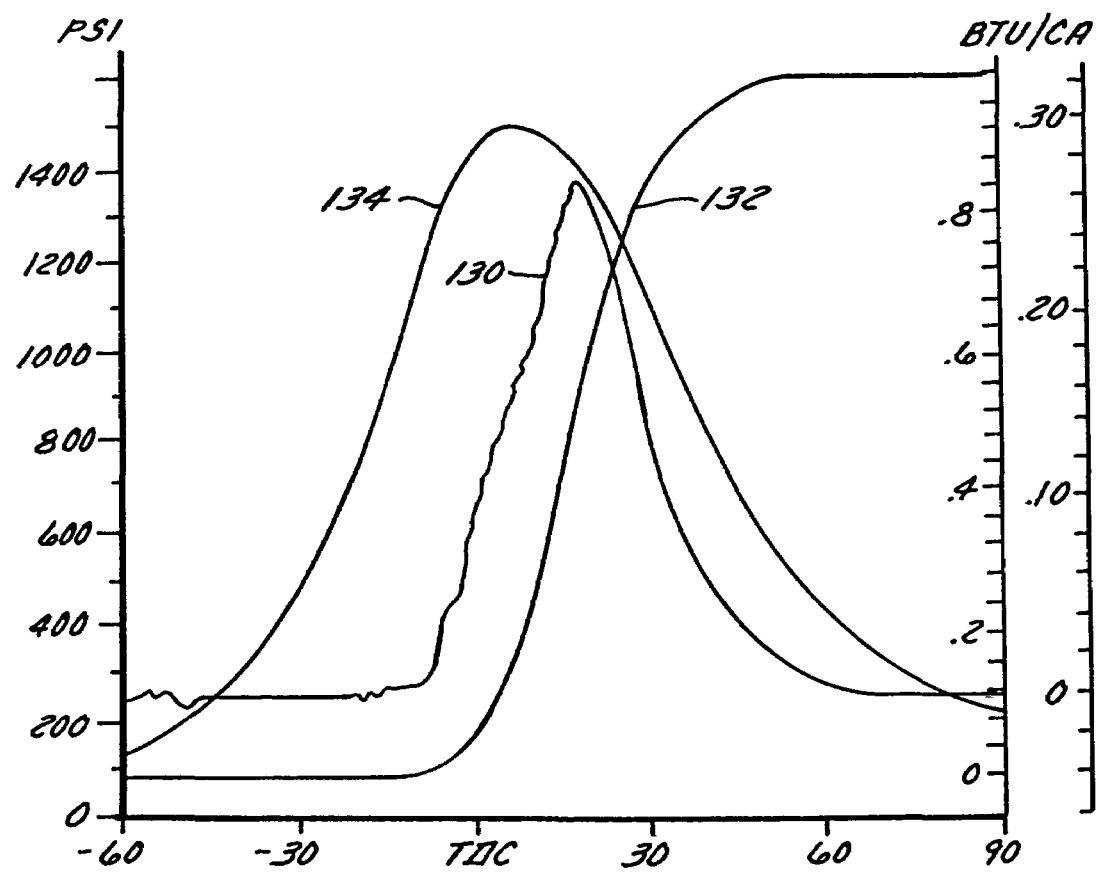
FIG. 11 is a set of graphs illustrating combustion characteristics of a dual fuel engine.

The effects of ignition intensity maximization can be appreciated by the curves of FIG. 11. Curves 130, 132, and 134 plot instantaneous heat release (BTU/c.a.), cumulative heat release (BTU), and cylinder pressure vs. crank angle position for a Caterpillar Model 3406B engine having a displacement of 2.4 l/cylinder and operating at a speed of 1,800 RPM and full load. Tp, Dp, and Ti are set at 18° BTDC, 6° c.a., and 12° c.a., respectively leaving a Dm of 6° c.a. and a Dp/Di of 0.5. Due to the effects of ignition intensity maximization, the instantaneous heat release curve 130 is very steep (and, in fact, approaches vertical) during pilot fuel combustion, which occurs from about 7° to 2° BTDC. Heat is released at the rate of 0.05 BTU/° c.a. or 0.5 BTU/msec. This high heat release leads to very rapid ignition of the main gaseous fuel charge, with a peak ignition intensity of about 220 kW/l. (This estimate of heat release rate was calculated assuming that only half of the ignition energy was generated by the pilot fuel. (This percentage is adjustable by EGR and/or water injection into the intake air fuel mixture etc.) As can be seen from curve 132, cumulative heat release therefore builds very rapidly throughout the combustion event, reflecting effective combustion of a nearly homogenous and low NOx emissions.

Figure 13:
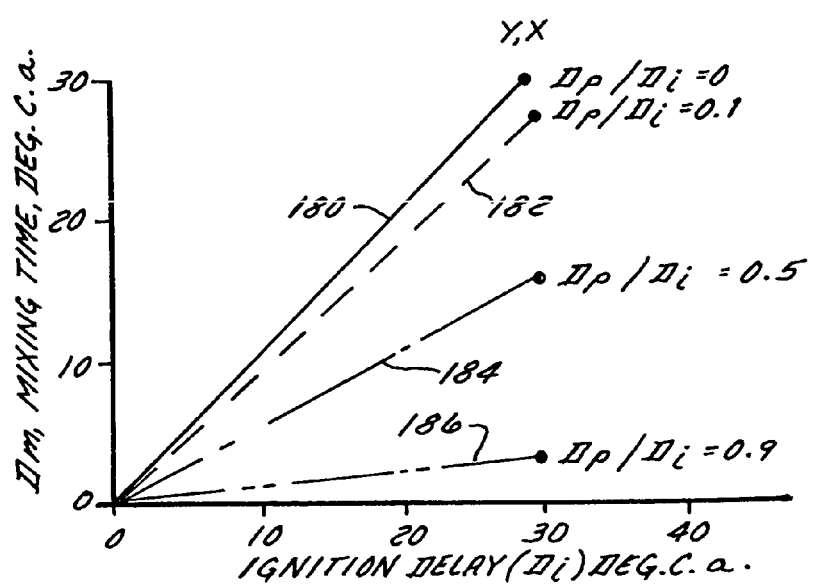
FIG. 13 is a set of graphs illustrating the effects of ignition delay on mixing times at various Dp/Di ratios.

Assuming for the moment that Tp and Dp are constant, Dm and, accordingly Di/Dp, can be varied by varying autoignition timing Ti. As can be appreciated from the curves 180, 182, 184, and 186 of FIG. 13, the effects of Di variation on mixing time will depend upon the Dp/Di obtained as a result of the Di variation and/or Dp variation. The curves demonstrate that Dm is much more sensitive to Di changes at low Dp/Di ratios than at high Dp/Di ratios (compare curve 180 to curve 186). These curves also demonstrate that longer mixing times are more easily achieved at low Dp/Di ratios, favoring the maintenance of Dp/Di ratios of less than 0.5, and preferably less than 0.2, to permit the production of an adequately large Dm without having to overly-retard Ti. The data used to generate FIG. 13 is reproduced as Table 4:

TABLE 4

RELATIONSHIP BETWEEN Tp AND Di

| Start of Injection, Tp | Ignition Delay, Di, ° c.a. | | |
|---|---|---|---|
| Deg. BTDC | Low ACT | Medium ACT | High ACT |
| 0 | 2 | 5 | 8 |
| 10 | 3 | 7 | 11 |
| 18 | 6 | 11 | 16 |
| 28 | 16 | 21 | 26 |
| 40 | 28 | 33 | 38 |

The manner in which Ti can be varied to optimize Dm for a particular set of engine operating characteristics requires an understanding of the factors affecting it.

Autoignition timing is primarily dependent on the following factors:

Engine compression ratio;
Air charge temperature (ACT);
Compression pressure (MEP);
Compression temperature;
Fuel Cetane number;
Gas fuel compression exponent, Cp/Cv;
Air/fuel ratio (Lambda);
Exhaust Gas Recirculation (EGR).

Of these factors, engine compression ratio, fuel Cetane number, and Cp/Cv are constant for a particular engine fueled by a particular fuel and without EGR or water recirculation. In addition, compression temperature is directly dependent on ACT, and compression pressure is directly dependent on manifold absolute pressure, MAP. Lambda is dependent on A) the mass of a gaseous fuel charge supplied to the combustion chamber, B) the mass of the air charge supplied to the combustion chamber, C) ACT, D) MAP, and E) fraction of firing cylinders, FFC, in a skipfire operation.

Figure 12:
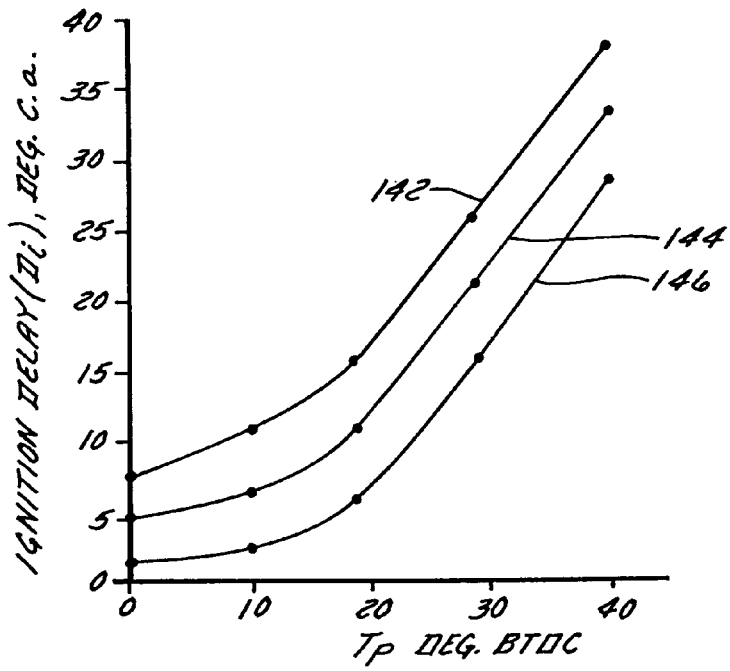
FIG. 12 is a set of graphs illustrating the effects of varying ACT on ignition delay at various pilot fuel injection timings.

As discussed above, Di and, accordingly, Dm and Di/Dp can also be varied by varying the injection timing Tp injection duration is usually maintained to be as short as possible and, therefore, is seldom intentionally varied. However, it may be desirable to adjust pilot quantity, injection pressure, etc., to tailor the pilot spray to be assisted in optimization of the pilot ignition event. The relationship between Tp and Di varies with several factors, most notably ACT and/or EGR. This fact can be appreciated from the curves 142, 144, and 146, in FIG. 12, which plot Di vs. Tp for low ACT, medium ACT, and high ACT, respectively. These curves illustrate that, if one wishes to obtain the desired Dm and Di/Tp by obtaining a Di of, e.g., 15° c.a., Tp will be about 18° BTDC at a low ACT of about 30° C., 24° BTDC at a medium ACT of about 50° C., and 30° BTDC at a high ACT of about 70° C.

In summary, ignition intensity maximization can be achieved by maintaining Dp/Di less than 1, preferably less than 0.5, and often between 0.1 and 0.2 or even lower. Dp/Di can be altered by adjusting Tp, Dp, and/or Di. The primary caveat is that any control of Dp/Di should not result in a Dm that risks misfire. Variations in Dp/Di are often reflected by and dependent upon variations in Dm. Hence, pilot ignition intensity maximization often can be thought of as optimizing Dm on a full time, full range basis. Possible control schemes for optimizing Dm will now be detailed.

ii. Open Loop Control

Figure 14:
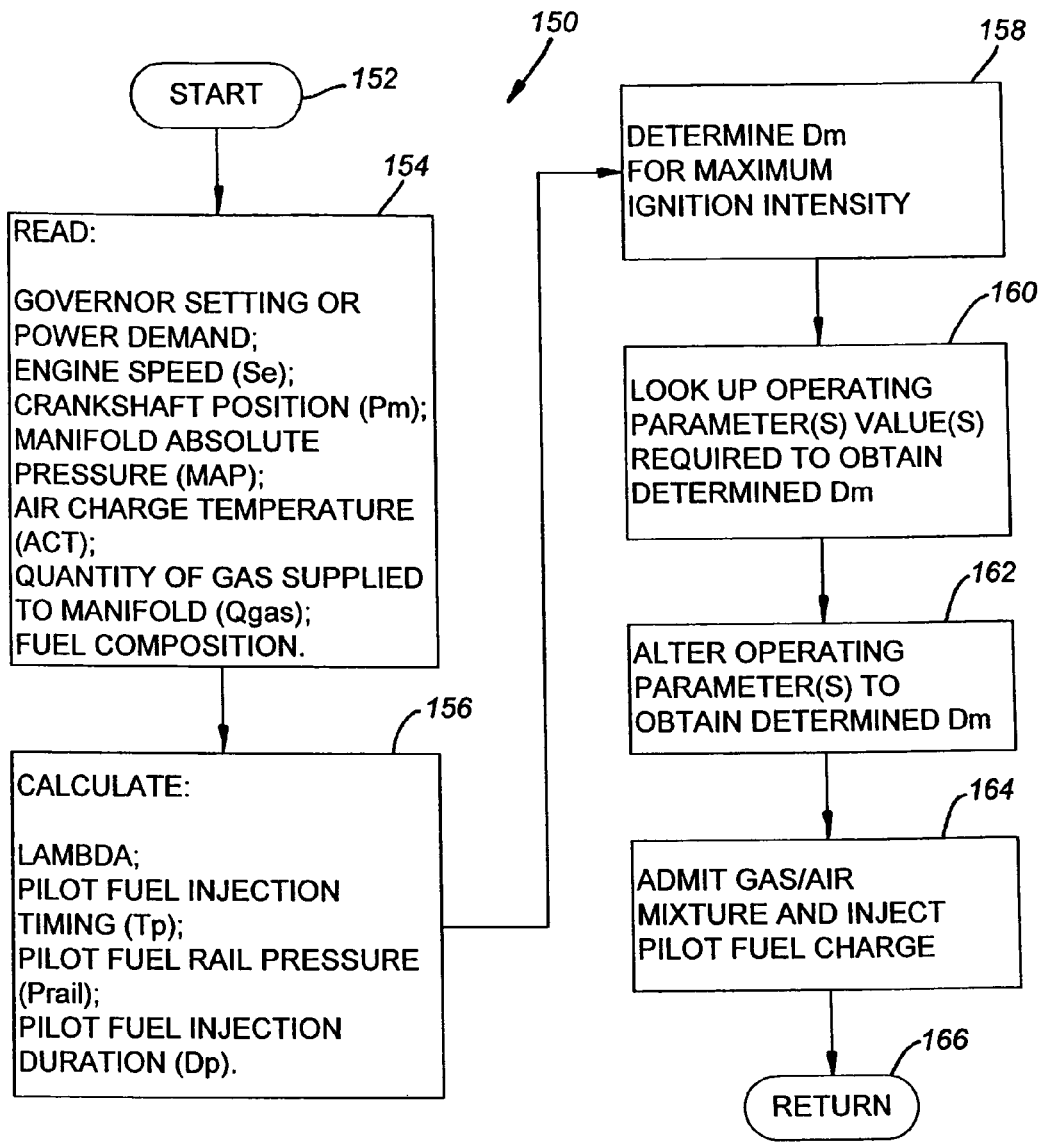
FIG. 14 is a flowchart illustrating an open loop control scheme for maximizing pilot fuel ignition intensity in accordance with the invention.

Referring now to FIG. 14, one possible routine for maximizing ignition intensity on a full time full, range basis is illustrated at 150. The routine 150 preferably is implemented by the controller 56 of FIG. 8 using the various sensors and control equipment illustrated in that Figure. The routine optimizes Dp/Di by optimizing the mixing period, Dm. Typically, Dm will be optimized by optimizing Tp, Di, or both. The routine 150 proceeds from START at 152 to block 154, where various engine operating parameters are read, using preset values and readings from the sensors of FIG. 8. These operating parameters may include:

Governor setting or some other indication of power demand;
Engine speed (Se);
Crank shaft position (Pm);
Manifold absolute pressure (MAP);
Air charge temperature (ACT);
Exhaust gas recirculation (EGR).
The quantity of gas applied to the manifold ($Q_{GAS}$); and
Fuel composition;

After this data is entered, the routine 150 proceeds to block 156 and initially calculates the engine operating parameters that affect Dm, including lambda, pilot fuel rail pressure, $P_{RAIL}$, Tp, and Dp. Then, in block 158, the routine 150 determines a value of Dm required to obtain maximum ignition intensity. The optimum Dm under particular operating conditions preferably is obtained from a look-up table calibrated for a full range of engine operating conditions including speed, load, lambda, etc.

Once the optimum Dm is determined, the routine 150 proceeds to block 160, where a look-up table is utilized to determine the proper setting(s) of one or more operating parameters required to obtain the determined Dm under the prevailing engine operating conditions. As should be apparent from the above, the selection of the parameter(s) to be adjusted, as well as the magnitude of adjustment, will vary based upon several factors including the instantaneous speed and load and other, simultaneously running, routines such as a lambda optimization routine. As discussed above, the controlled parameter typically will be a combination of Tp, lambda, MAP, ACT and EGR if used. If Tp is constant, or is controlled solely based on other considerations, Dm can be adjusted by adjusting Ti. Ti can be adjusted both by adjusting the initial air temperature (i.e., the temperature at the beginning of the injection/combustion cycle) and by adjusting the rate of rise of the air temperature within the combustion chamber during the compression phase of the engine's operating cycle. In this case, the initial air temperature can be adjusted by modifying ACT. The rate of air temperature rise can be adjusted, e.g., by adjusting one or more of exhaust gas recirculation (EGR), water injection, MAP, and lambda.

The look-up table contains empirically determined information concerning the effects of each of these parameters on Dm under various engine operating conditions, and the controller 56 selects the particular setting(s) required to obtain a Dm that is within an acceptable range for maximizing ignition intensity. Alternatively, Tp can be adjusted to obtain an optimum Di and, accordingly, an optimum Dm, using data compiled, e.g., from the Tp v. Di curves of FIG. 12.

The routine then proceeds to block 162, where the controlled engine operating parameter(s) is/are adjusted as necessary to obtain the value of Dm determined in block 160. As a result, when a gas/air mixture is admitted into the combustion chamber and the pilot fuel charge is injected into the premixed charge of gas and air in block 164, the determined optimum Dm will be obtained, resulting in desired Dp/Di and maximization of ignition intensity. The routine then proceeds to RETURN in block 166.

iii. Closed Loop Control

Figure 15:
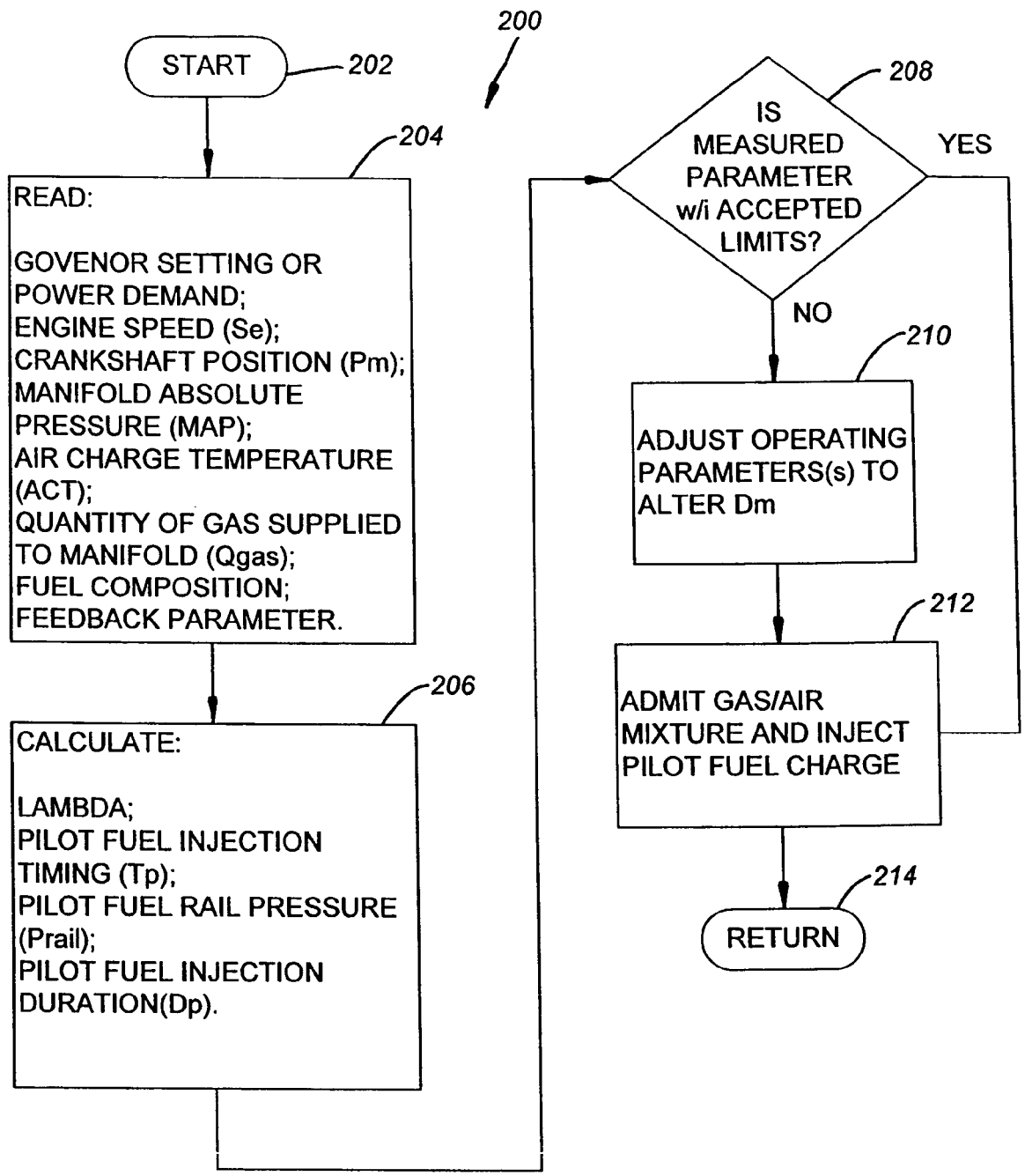
FIG. 15 is a flowchart illustrating a closed loop control scheme for maximizing pilot fuel ignition intensity in accordance with the invention.

Ignition intensity could alternatively be maximized in a closed loop fashion using a measured parameter obtained, e.g., from a fast $NO_X$ sensor, a knock detector, a cylinder pressure sensor, or a flame ionization detector as feedback. Fundamentally, flame ionization is preferred as a feedback parameter because it can be relatively easily monitored on a cycle-by-cycle basis and can provide a direct measurement of Di since Di=Tp−Ti and Dm=Tp−Ti−Dp. Referring to FIG. 15, a routine 200 implementing closed loop feedback control proceeds from START at block 202 and proceeds through reading and calculation steps 202 and 204 as in the open loop example of FIG. 14, except for the fact that one or more additional values to be used as feedback, such as flame ionization, is read in block 204. Then, in block 206, the measured value of the feedback parameter is compared to a predetermined value or range of values to determine whether Dm adjustment is necessary. If the answer to this inquiry is YES, indicating that no mixing period adjustment is required, the routine 200 proceeds to step 212 and controls a fuel admission, pilot fuel injection, and fuel ignition cycle without adjusting Dm. If, on the other hand, the answer to the inquiry of block 206 is NO, indicating that the ignition delay utilized in the preceding cycle needs to be altered, the routine 200 proceeds to block 210 and alters one or more engine operating parameters to alter Dm. Just as before, the altered parameters could be Tp, ACT, MAP, lambda, or any combination of them. The magnitude of the adjustment may be constant or may be dependent upon the magnitude of the deviation between the measured value will normally be proportional to the difference between the desired Dm and the actual Dm.

The routine 200 then proceeds to block 212 as before to initiate and a pilot fuel injection, gaseous fuel/air charge admission, and ignition and combustion cycle. The routine then proceeds to RETURN in block 214.

c. Ignition Intensity Maximization Control Through Power Maximization of Power of Pilot Ignition Maximized ignition intensity has thus far been described in terms of optimum Dp/Di or factors relating to it such as optimum Di or optimum Dm. However, it is also useful to think of maximum ignition intensity in terms of the maximum instantaneous power that is generated by the pilot charge during autoignition. Maximum instantaneous power output can be obtained by controlling injection timing, injection duration, and/or ignition delay to obtain a uniform distribution of pilot fuel throughout the combustion chamber with an optimum size and number of droplets.

This model of ignition intensity maximization can be appreciated through the use of a specific example. In a compression ignition pilot, ignited charge for an engine with 2.4 liter displacement per cylinder, a 16:1 compression ratio, and a diesel pilot quantity of 2 mm$^3$, ignition intensity maximization occurs when the injected pilot fuel takes the form of uniformly distributed droplets of an average diameter of 50 microns. If the gas/air charge is at lambda of 2.0, the projected combustion characteristics are as follows:

TABLE 5

PROJECTED COMBUSTION CHARACTERISTICS
RESULTING FROM MAXIMIZED IGNITION INTENSITY

| | |
|---|---|
| Droplet diameter | 0.050 mm |
| Number of droplets | 30,560 |
| Air/gas cell diameter | 2 mm |
| Flame travel | 1 mm |
| Flame speed | 1 m/sec |
| Combustion duration | 1.0 millisecond |
| Ignition power in 1.0 m/sec | 70 kW |

In the above example, autoignition results from the instantaneous combustion of over 30,000 droplets, each of which acts like a miniature sparkplug. The resultant autoignition produces an instantaneous power of 70 kW or about 30 kW/l, leading to extremely effective ignition of the gaseous fuel in the combustion chamber. This maximum ignition intensity is reflected by the peak on the curve 130 of FIG. 11. Other calculations have shown that the obtainment of peak ignition intensity of over 200 kW/l of displacement may be possible.

As indicated above, it has been discovered that it is also possible to achieve HCCI with a liquid fuel which, once achieved, preferably is optimized by controlling the injection process to terminate the injection before the start of ignition using the procedures described above. Suitable mechanisms and procedures for obtaining a homogenous mixture of liquid fuel and air and for the HCCI combustion of the resultant mixture will now be described.

4. Construction and Operation of Liquid Fuel HCCI Engines

Figure 16:
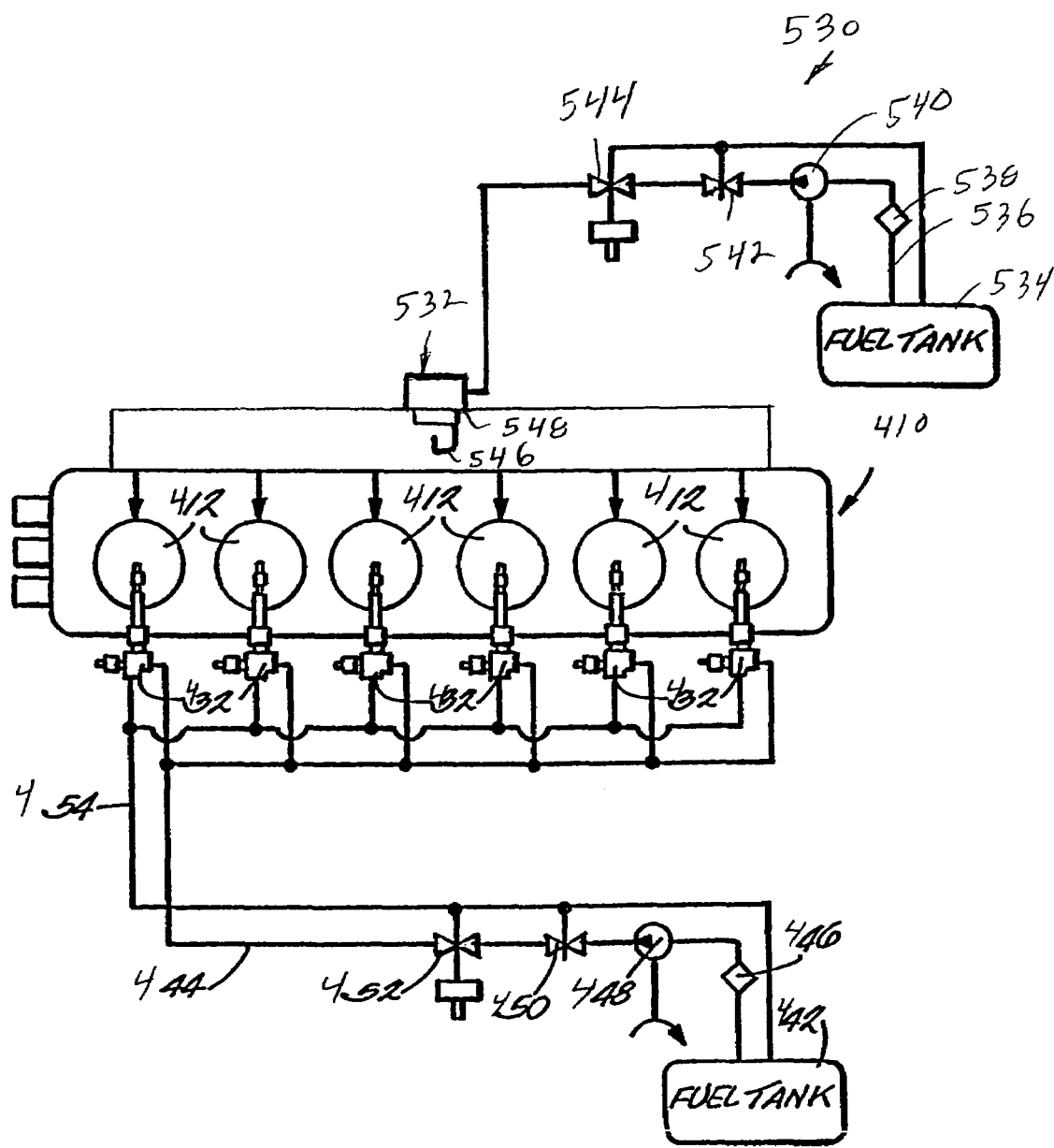
FIG. 16 schematically illustrates the fuel supply system of a second embodiment of an internal combustion engine in which the inventive ignition intensity maximization control scheme can be implemented and which is also suitable for HCCI of a liquid primary fuel.
Figure 17:
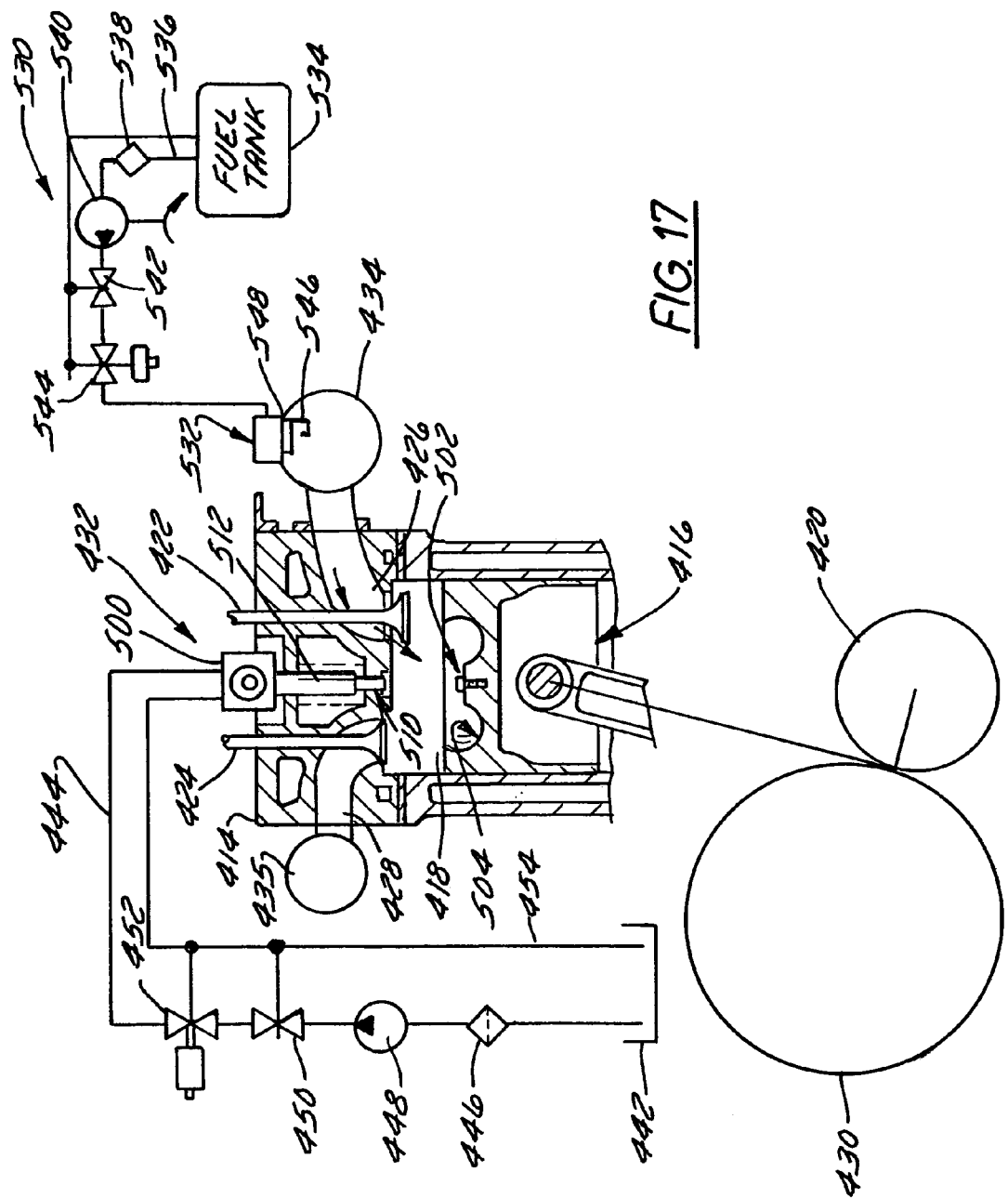
FIG. 17 is a partially schematic sectional side elevational view of a portion of the engine of FIG. 16.
Figure 18:
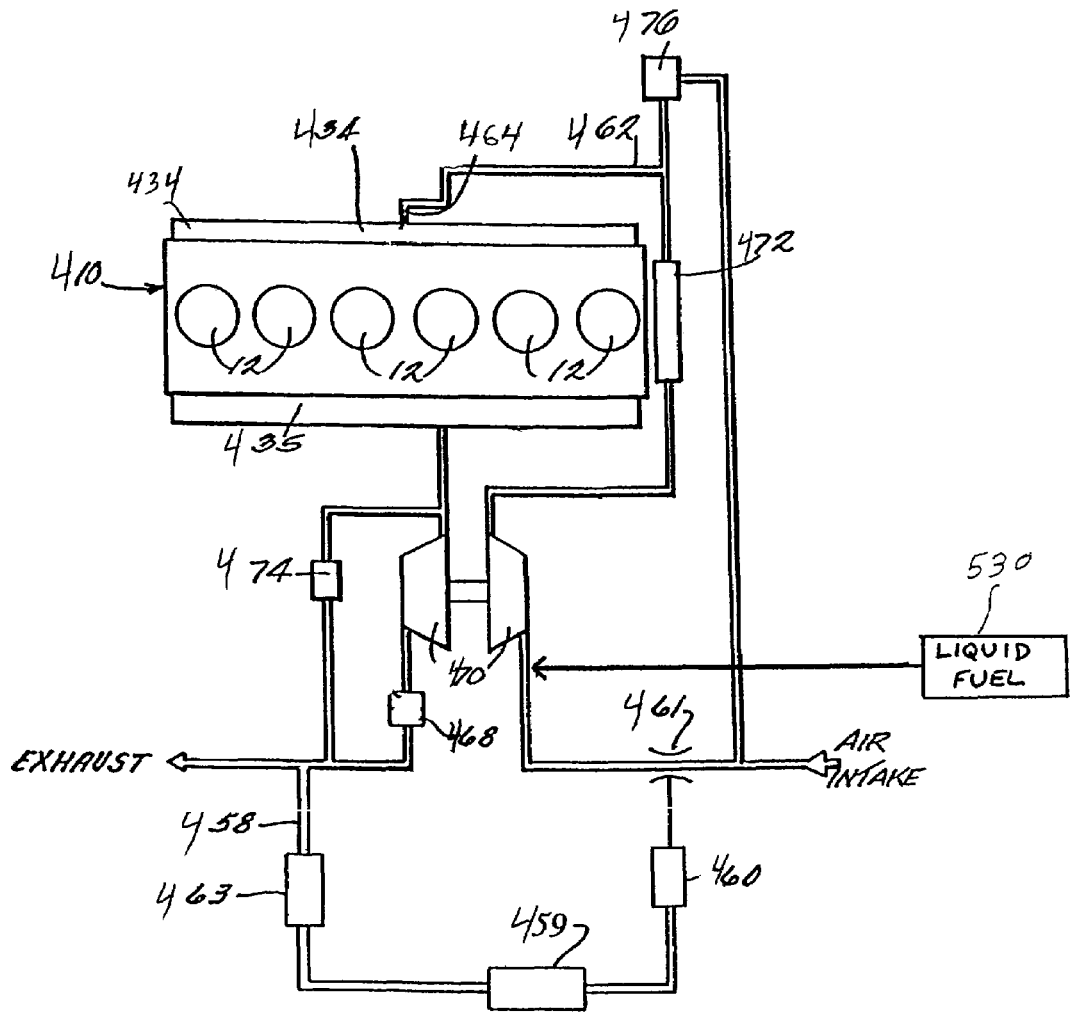
FIG. 18 schematically illustrates the combustion airflow system of the engine of FIGS. 16 and 17, modified to supply the primary fuel to the engines air intake system at a different location.

Turning now to FIGS. 16–18, an engine 410 suitable for the HCCI combustion of a liquid primary fuel is schematically illustrated. Except for incorporating a different primary fuel supply system, engine 410 is identical to the engine 10 of the first embodiment. Components of engine 410 corresponding to engine 10 are, therefore, designated by the same reference numerals, incremented by 400. Engine 410 therefore includes a plurality of cylinders 412 each capped by a cylinder head 414 (FIG. 17). As also shown in FIG. 17, a piston 416 is slidably enclosed in the bore of each cylinder 412 to define a combustion chamber 418 between the cylinder head 414 and the piston 416. Piston 416 is also connected to a crankshaft 420 in a conventional manner. Conventional inlet and exhaust valves 422 and 424 are provided at the end of respective passages 426 and 428 in the cylinder head 414. Valves 422 and 424 are actuated by a standard cam shaft 430 so as to control the supply of an air fuel mixture into and the exhaustive combustion products out from the combustion chamber 418. A primary fuel and air mixture is supplied to the engine 410 via an intake manifold 434, and exhaust gases are exhausted from the engine via an exhaust manifold 435. Pilot fuel is supplied to the engine via multiple electronically controlled liquid fuel injector assemblies 432 of the type described above. Also as described above, each injector assembly 432 is supplied with fuel from a conventional tank 442 via a supply line or common rail 444, a filter 446, a pump 448, a high pressure relief valve 450, and a pressure regulator 452. A return line 454 leads from each injector assembly 432 to the tank 442.

Referring to FIG. 18, the air intake control system includes an EGR cooler 459 and an EGR metering valve 460 located in a return line 458 leading from the exhaust manifold 435 to the intake manifold 434. The line 458 may be connected to the exhaust line containing the wastegate 474 at its inlet end, and preferably empties into the intake line at its outlet end with the aid of a mixing venturi 461. An EGR filter 463 is also located in the line 458 upstream of the EGR cooler 459. A second line 462 leads from a turbo bypass valve 476 and back to the air inlet system via a port 464 opening into the air intake manifold 434. An EBP valve 468 is provided and is actuated by the controller 456 described above.

Still referring to FIG. 18, the turbocharging system of the intake air control system includes a turbocharger 470 and an aftercooler 472 provided in line 462 upstream of the valve 460 in the intake port 466. Operation of the turbocharger 470 is controlled by the wastegate 474 and a turbo bypass 476, both of which are electronically coupled to the controller 456 and actuated as described in Section 2(b) above.

Referring again to FIG. 17, each fuel injector assembly 432 is an OSKA-ECIS fuel injector that includes the same high discharge coefficient injector includes a high discharge coefficient injector 500 on a so-called OSKA impingement target 502 as described above. Also as described above, the injector 500 preferably includes a pintle nozzle 510 including a nozzle body 512 in which is housed a needle valve assembly that includes a nozzle needle and a valve seat. Other components of the nozzle 510 and the impingement target 502 are identical to the corresponding components of the first embodiment and, therefore, need not be described.

The engine 410 additionally includes a primary fuel source 530 configured to supply atomized liquid fuel to the engine's air intake system in a manner that results in the induction of a homogenous charge of fuel and air into the combustion chamber 418 of the engine. Fuel may be supplied either directly into the intake manifold 434 as seen in FIGS. 16 and 17, into the inlet of the turbocharger compressor as seen in FIG. 18, or some other portion of the air intake system entirely. At present, it is preferred that primary fuel be supplied into the inlet of the compressor as seen in FIG. 18. Supplying atomized liquid fuel at this location increases the turbo-boosted air mass flow to the turbocharger 470 because evaporation of the atomized fuel droplets cools the inlet air and makes it denser, resulting in an increase in the air mass flow through the turbocharger 470. When the quantity of fuel droplets increases at high engine load, the air mass flow will increase accordingly, reducing or perhaps even negating the need to control the wastegate 474 and potentially permitting the elimination of the wastegate 474 entirely.

Referring again to FIGS. 16 and 17, the primary fuel supply system 530 includes at least one, and preferably a plurality, of independently electronically controlled fuel injector assemblies 532. Each injector assembly 532 is fed with fuel from a conventional tank 534 via a supply line or common rail 536. Disposed in line 536 are a filter 538, a pump 540, a high pressure relief valve 542, and a pressure regulator 544. In order to provide the desired atomization effect, the pump 540 is a higher pressure pump than is conventionally found in diesel engines. The pump 540 preferably has an output pressure of 2,000 to 3,000 psi in the intake air stream.

Figure 19:
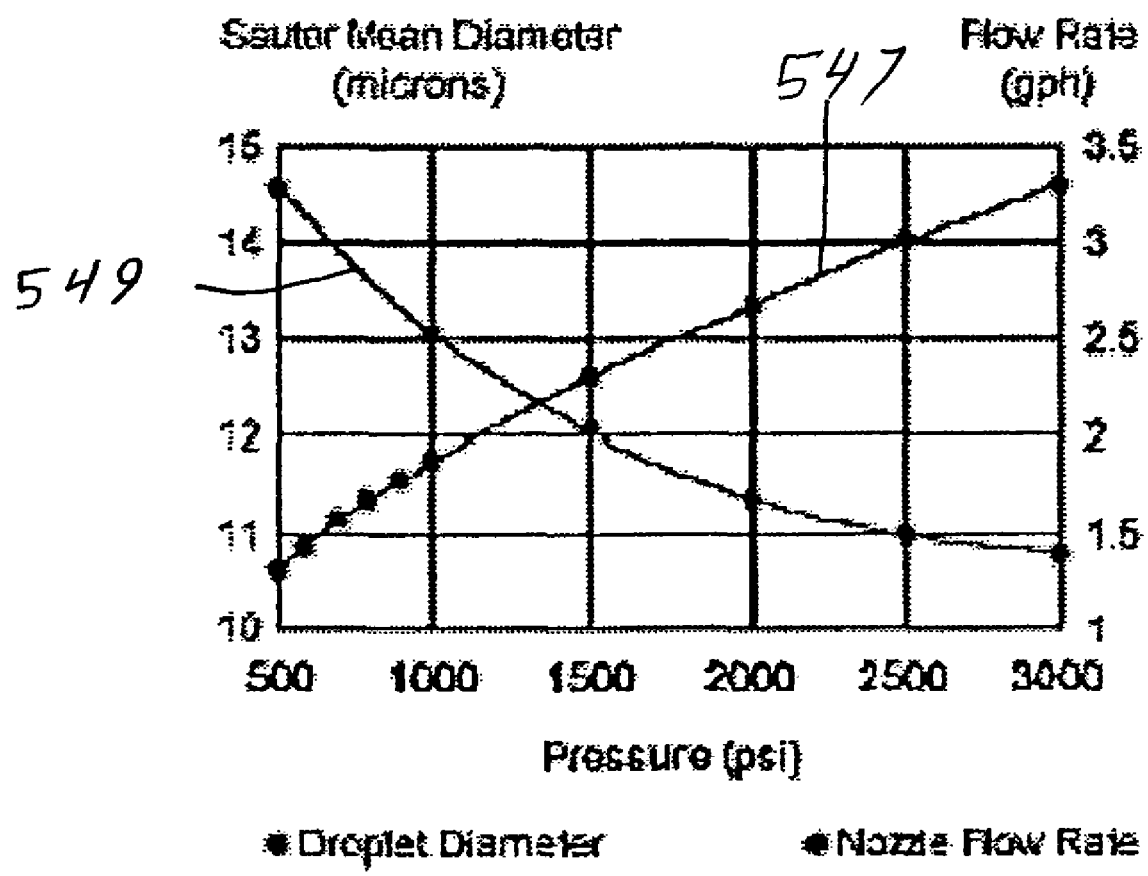
FIG. 19 is a graph illustrating the relationship between pressure and mean droplet diameter for a liquid fuel injected using a particular fogging nozzle of the engine of FIGS. 16–18.

Each injector assembly 532 is configured to supply finely atomized fuel that can rapidly homogenously mix with the intake air. A suitable injector assembly has a nozzle that supplies fuel in the form of atomized droplets having a mean diameter of less than about 50 microns and more preferably less than about 30 microns. A so-called "fogging nozzle" of the type commonly used to inject cooling water into gas turbines or to humidify a variety of items is suitable for this purpose. A particularly preferred fogging nozzle is one which has an impaction device which is located downstream from the injector's nozzle outlet and against which the injected fuel impinges. A fogging nozzle of this type is commercially available from Mee Industries Inc. of Monrovia, Calif. and is known as the "MeeFog Impaction Pin Nozzle." The MeeFog™ nozzle is fabricated of stainless steel and has a J-shaped impaction pin 546 extending outwardly from the downstream end of the injector's nozzle body 548 as seen in FIGS. 16 and 17. Depending on the inlet pressure and fuel flow rate the MeeFog™ nozzle produces fog droplets as small as 7 microns in mean diameter. The relationship between pressure, flow rate, and mean droplet diameter from such a nozzle is illustrated by the curves 547 and 549 in FIG. 19.

More than one fogging nozzle is required to supply adequate fuel for most HCCI engines. The number of nozzles required for a particular engine will depend upon, inter alia, the engine size on a horsepower basis and the flow capacity of a given nozzle. If a MeeFog nozzle having a 0.006" diameter orifice is employed in each injector assembly, eight nozzles having a flow rate capacity of 2.6 gallon/hour each will be sufficient for a 380 horsepower HCCI engine.

Fuel quantity can be selected by regulating fuel flow through a variety of mechanisms, such as regulating the fuel supply pressure via operation of the valve 544, disabling selected injectors 532, or pulse modulating the fuel flow through enabled injectors, and/or adjusting the nozzle orifice diameter (if the injector assembly has of an adjustable orifice nozzle). As one example, eight MeeFog nozzles having a 0.006" fixed nozzle orifice diameter can supply adequate fuel to operate a 380 Hp engine under full load/full speed conditions. Pulse modulation of one of those nozzles at a 20% duty cycle will be adequate to maintain engine idle at 700 rpm with no load.

As indicated above, optimal HCCI combustion of liquid fuels requires proper selection of both pilot and primary fuels. (Reference hereunder to a "primary" fuel should not be construed as an indication that the invention is limited to a multi fuel engine having only two fuels. It is conceivable that the engine could be additionally fueled by a third fuel that is mixed with or supplied after the primary fuel. Indeed, it is conceivable that the primary fuel may be surpassed in volume and/or energy content by another fuel. The fuel is "primary" only to the extent that it is ignited by combustion of a much smaller quantity of pilot fuel). HCCI combustion without flame propagation can best be achieved by selecting a pilot fuel that has distinct characteristics. Specifically, the pilot fuel should have an autoignition temperature that is significantly below the autoignition temperature of the primary fuel. An autoignition differential of at least 30° C. is preferred. In addition, in order to maximize the vaporization rate of the injected pilot fuel charge and assure rapid combustion of the pilot fuel charge, the pilot fuel should have a relatively narrow boiling point temperature range while the pilot fuel charge concentration varies.

Acceptable primary fuels include Dimethyl Ether (DME); chemical formula—CH3—O—CH3; ethanol, and methanol (MTBE). DME is currently preferred because it has physical properties similar to those of LPG and has been proposed and tested as an alternative to diesel fuel in compression ignition engines. DME has a boiling point of −25° C. at a pressure of 1.0 bar, a liquid density of 0.66 gm/ml at 20° C., a Cetane number of 55–60, and an autoignition temperature of 350° C. If desired, hydrogen can be added or blended into the primary fuel. Hydrogen has a very high rate of combustion compared to other hydrocarbon-based fuels and, therefore, reduces HC and CO emissions when added to other fuels. Hydrogen's autoignition temperature is also higher than other fuels however, decreasing the engine's knock limit.

If DME is used as the primary fuel, diesel fuel will provide an acceptable pilot fuel. Diesel fuel has an autoignition temperature of 316° C. and a boiling point range of 220–340° C., depending upon the concentration or air fuel ratio.

Figure 20:
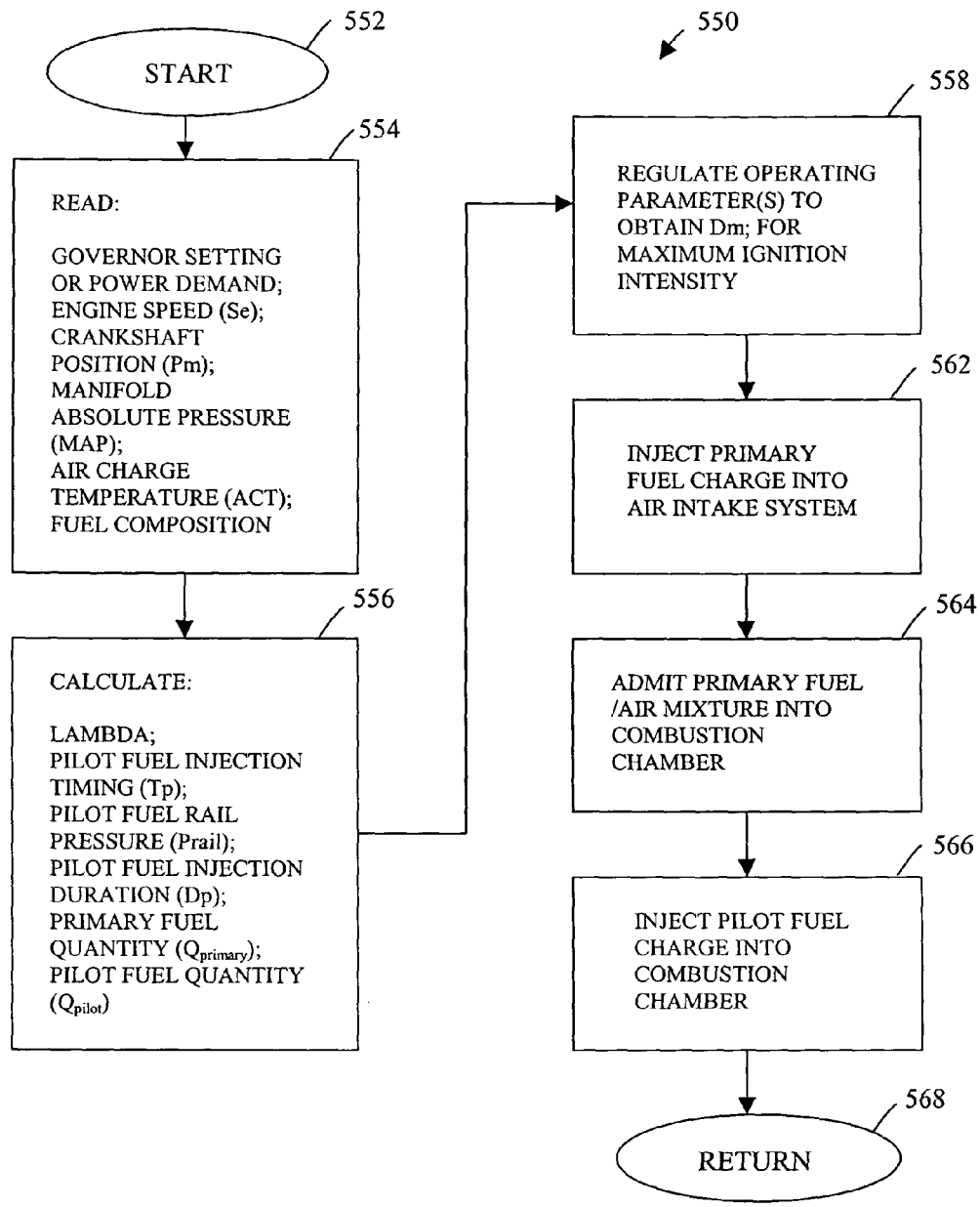
FIG. 20 is a flowchart illustrating a control strategy for effecting HCCI combustion in the engine of FIGS. 16–18.

The pilot and primary fuel systems may be controlled by the controller 56 of FIG. 8 by implementing a routine such as the one illustrated in the flowchart 550 of FIG. 20. Routine 550 proceeds from START in Block 552 to Block 554, where various engine operating parameters are read, using preset values and readings from the sensors of FIG. 8. These operating parameters are described in Section 2 above. The routine 550 then proceeds to Block 556 and initially calculates the engine operating parameters that affect Dm, including pilot fuel rail pressure, $P_{rail}$, Tp, and Dp. Primary fuel lambda is also calculated at this time, and preferably is maintained in the range of 2.0 and 2.2 to maximize HCCI. Routine 550 also calculates the pilot fuel quantity $Q_{pilot}$ and primary fuel quantity $Q_{primary}$ required for the engine's prevailing speed and load conditions. Then, in Block 558, the routine 550 regulates engine operation to obtain the Dm required for maximum ignition intensity. Dm determination and control may be performed either on an open loop basis as described above in connection with FIG. 14 or on a closed loop basis as described above in connection with FIG. 15. As discussed above, the controlled parameter typically will be a combination of Tp, lambda, MAP, ACT and EGR if used. The routine 550 then proceeds to block 562, where the primary fuel supply system 530 is controlled to inject the determined quantity $Q_{primary}$ of the primary fuel into the air intake system. As discussed above, the desired quantity can be delivered by regulating the fuel supply pressure via operation of the valves 542 and 544, disabling selected injector assemblies 532, pulse modulating the fuel flow through enabled injector assemblies 532, and/or adjusting the injector's nozzle orifice diameter (if the injector has of an adjustable orifice nozzle). The injected fuel enters the intake air stream as a finely atomized fog formed from millions of micron-sized droplets and rapidly vaporizes to form a homogenous mixture with the intake air. The homogenous mixture is not only well suited for HCCI combustion but, as discussed above, also can increase the turbo boosted air mass if the fuel is injected into the air intake system upstream of the turbocharger compressor inlet. The evaporation also provides air charge cooling, reducing the load on the aftercooler 472.

Next, in block 564, the intake valve 422 is opened (by operation the cam rather than by the controller 56; however, an electronically controlled intake valve could be employed) to admit the homogenous primary fuel/air mixture. The routine 550 then proceeds to Block 566, where the injector 532 is controlled to inject a determined quantity $Q_{pilot}$ into the combustion chamber at the determined time, Tp. Autoignition and HCCI combustion then occur automatically. The routine 550 then proceeds to RETURN in block 568, and the process is repeated on a cycle-by-cycle, full speed, full load basis.

Many changes and alterations could be made to the invention without departing from the spirit thereof.

For instance, while the first embodiment of the invention has been described primarily in conjunction with an engine in which the gaseous fuel is supplied during the piston's intake stroke, it is equally applicable to an engine in which the gaseous fuel is supplied by high pressure direct injection (HPDI) during the piston's compression stroke, typically near the TDC position of the piston. HPDI is described, e.g., in U.S. Pat. No. 5,832,906 to Westport Research Inc., the subject matter of which is incorporated by reference.

The scope of additional changes will become apparent from the appended claims.

We claim:

1. A method comprising:
    injecting a relatively small volume of a pilot fuel into a combustion chamber of a compression ignition engine so as to ignite a relatively large volume of a liquid primary fuel in the combustion chamber, while controlling at least one of a timing, Tp, of initiation of pilot fuel injection, a pilot fuel injection duration, Dp, and an ignition delay period, Di, such that Dp/Di is <1.

2. The method as recited in claim 1, wherein the controlling step comprises obtaining a mixing period, Dm>1° c.a., where Dm=Di−Dp.

3. The method as recited in claim 2, wherein the controlling step comprises obtaining a Dm of between 5° c.a. and 40° c.a.

4. The method as recited in claim 2, wherein the controlling step comprises altering autoignition timing, Ti.

5. The method as recited in claim 4, wherein said Ti is altered by adjusting exhaust gas recirculation, EGR.

6. The method as recited in claim 2, wherein Di is altered by adjusting at least one of
    (A) a temperature, ACT, of an air charge admitted into the combustion chamber;
    (B) a pressure, MAP, of the air charge admitted into the combustion chamber, and
    (C) an air/fuel ratio, lambda, of a natural gas/air mixture in the combustion chamber.

7. The method as recited in claim 6, wherein said ACT is adjusted by at least one of
    (A) altering a percentage of exhaust gas recirculation, EGR, from an exhaust of the engine to the combustion chamber,
    (B) altering operation of at least one of 1) a supercharger, 2) a turbocharger, 3) an aftercooler, and 4) an expansion turbine located downstream of the aftercooler,
    (C) altering operation of an intercooler which cools intake air being supplied to the combustion chamber, and
    (D) injecting water into an intake mixture.

8. The method as recited in claim 6, wherein said MAP is adjusted by adjusting at least one of
    A) an operating state of a turbo air bypass valve to control a percentage of intake airflow that bypasses the compressor output of the turbocharger of the engine, and
    B) a waste gate or a variable turbine nozzle of a turbocharger.

9. The method as recited in claim 6, wherein lambda is adjusted by altering at least one of
    A) a value of a vaporized fuel charge supplied to the intake system or combustion chamber,
    B) a mass of the air charge supplied to the combustion chamber,
    C) ACT,
    D) MAP, and
    E) a fraction of firing cylinders, FFC, in a skipfire operation.

10. The method as recited in claim 2, wherein the controlling step comprises adjusting at least one of Tp and Dp.

11. The method as recited in claim 2, wherein the controlling step comprises adjusting a rate of pilot fuel combustion in the combustion chamber by adjusting at least one of a size, a number, a distribution, and a fraction of vaporization of pilot fuel droplets in the combustion chamber.

12. The method as recited in claim 1, wherein the injecting step comprises operating an electronically actuated fuel injector coupled to a source of a fuel that is combustible by compression-ignition.

13. The method as recited in claim 12, wherein the injector comprises one which injects fuel in an expanding cloud during at least a substantial portion of an injection event.

14. The method as recited in claim 1, wherein said pilot fuel has a relatively narrow boiling point temperature range and lower autoignition temperature than said primary fuel.

15. The method as recited in claim 14, wherein said pilot fuel comprises diesel fuel and said primary fuel comprises Dimethyl Ether.

16. The method as recited in claim 15, wherein said primary fuel is supplied to an air intake system of said engine as a fog of droplets having a mean diameter in the micron range.

17. The method as recited in claim 16, wherein said droplets have a mean diameter of about 5 microns to about 20 microns.

18. The method as recited in claim 16, wherein said primary fuel is supplied via at least one fogging nozzle.

19. The method as recited in claim 16, wherein said primary fuel is injected either directly into an air intake manifold of said engine or into an inlet of a compressor of a turbocharger of said engine.

20. The method as recited in claim 1, wherein said primary fuel is supplied to the engine so as to homogeneously mix with air, thereby permitting homogeneous charge compression ignition (HCCI) of said primary fuel.

21. A method comprising:
    supplying a relatively large volume of a liquid primary fuel to a combustion chamber of a compression ignition engine so as to form a homogeneous mixture of said primary fuel and air in said combustion chamber;
    injecting a relatively small volume of a pilot fuel into said combustion chamber, said pilot fuel having a lower autoignition temperature than said primary fuel and having a relatively narrow boiling point temperature range; and
    autoigniting said pilot fuel by compression ignition and igniting said primary fuel through combustion of said pilot fuel, thereby obtaining pilot assisted HCCI combustion of said primary fuel.

22. The method as recited in claim 21, further controlling at least one of a timing, Tp, of initiation of pilot fuel injection, a pilot fuel injection duration, Dp, and an ignition delay period, Di, such that Dp/Di is <1.

23. The method as recited in claim 21, wherein said pilot fuel comprises diesel fuel and said primary fuel comprises Dimethyl Ether.

24. The method as recited in claim 21, wherein said primary fuel is supplied to an air intake system of said engine as a fog of droplets having a diameter in the micron range.

25. The method as recited in claim 24, wherein said droplets have a diameter of about 5 microns to about 20 microns.

26. The method as recited in claim 25, wherein said primary fuel is supplied via at least one fogging nozzle.

27. The method as recited in claim 26, wherein said primary fuel is supplied via a plurality of fogging nozzles, and further comprising adjusting a primary fuel supply quantity by at least one of
   A) adjusting primary fuel supply pressure;
   B) pulse-width-modulating flow through at least one of said nozzles;
   C) varying an orifice diameter of at least one of said nozzles; and
   D) disabling at least one of said nozzles.

28. The method as recited in claim 26, wherein said fogging nozzle has an impaction device against which injected fuel impinges to atomize fuel droplets.

29. A method comprising:
   A) injecting a liquid fuel into an air stream so as to form a homogeneous mixture of air and atomized droplets of fuel having a mean diameter of less than about 50 microns;
   B) admitting said mixture into a combustion chamber of an internal combustion engine; and
   C) igniting the liquid fuel in said mixture by compression ignition so as to achieve homogeneous charge compression ignition (HCCI) of said liquid fuel, wherein, after the injecting step, said liquid fuel evaporates and cools the air in said mixture.

30. The method as recited in claim 29, wherein the injecting step comprises injecting atomized droplets having a mean diameter of between about 5 microns and about 20 microns.

31. The method as recited in claim 29, wherein said liquid fuel is injected via at least one fogging nozzle.

32. The method as recited in claim 31, wherein said fogging nozzle has an impaction device against which injected fuel impinges to atomize fuel droplets.

33. The method as recited in claim 29, wherein the injecting step is performed on a full range of engine operating speeds and engine loads.

34. A method comprising:
   A) injecting a liquid fuel into an air stream so as to form a homogeneous mixture of air and atomized droplets of fuel having a mean diameter of less than about 50 microns;
   B) admitting said mixture into a combustion chamber of an internal combustion engine; and
   C) igniting the liquid fuel in said mixture by compression ignition so as to achieve homogeneous charge compression ignition (HCCI) of said liquid fuel, wherein said liquid fuel is injected via a plurality of fogging nozzles, and further comprising adjusting a fuel supply quantity by at least one of
      A) adjusting fuel supply pressure;
      B) pulse-width-modulating flow through at least one of said nozzles;
      C) varying an orifice diameter of at least one of said nozzles; and
      D) disabling at least one of said nozzles.

35. A method comprising:
   A) injecting a liquid fuel into an air stream so as to form a homogeneous mixture of air and atomized droplets of fuel having a mean diameter of less than about 50 microns;
   B) admitting said mixture into a combustion chamber of an internal combustion engine; and
   C) igniting the liquid fuel in said mixture by compression ignition so as to achieve homogeneous charge compression ignition (HCCI) of said liquid fuel, wherein said liquid fuel is a primary fuel, and further comprising injecting a relatively small volume of a pilot fuel into said combustion chamber, said pilot fuel having a lower autoignition temperature than said primary fuel and having a relatively narrow boiling point temperature range; and wherein
   the compression ignition step comprises autoigniting said pilot fuel by compression ignition and igniting said primary fuel through combustion of said pilot fuel, thereby obtaining pilot assisted HCCI of said primary fuel.

36. The method as recited in claim 35, wherein said pilot fuel comprises diesel fuel and said primary fuel comprises Dimethyl Ether.

37. The method as recited in claim 35, further controlling at least one of a timing, Tp, of initiation of pilot fuel injection, a pilot fuel injection duration, Dp, and an ignition delay period, Di, such that Dp/Di is <1.

38. A method comprising:
   A) injecting a liquid fuel into an air stream so as to form a homogeneous mixture of air and atomized droplets of fuel having a mean diameter of less than about 50 microns;
   B) admitting said mixture into a combustion chamber of an internal combustion engine; and
   C) igniting the liquid fuel in said mixture by compression ignition so as to achieve homogeneous charge compression ignition (HCCI) of said liquid fuel,
   wherein a turbocharger and a cooler are located in series in an air intake passage through which said air stream passes, and wherein the injecting step comprises injecting the liquid fuel into the air intake passage upstream of the turbocharger.

39. A method of operating an engine having a cylinder which includes an engine head and a piston which is reciprocateably translatable in the cylinder to define a variable-volume combustion chamber between the engine head and the piston, the method comprising the steps of:
   (A) performing an intake stroke of the piston;
   (B) performing a compression stroke of the piston after the intake stroke;
   (C) admitting a homogeneous charge of a liquid fuel and air into the combustion chamber during one of the intake stroke and the compression stroke, said homogeneous charge being formed by injecting said liquid fuel into the intake air stream in the form of atomized droplets having a mean diameter of less than about 30 microns;
   (D) injecting a pilot fuel charge into the combustion chamber during the compression stroke, said pilot fuel having a lower autoignition temperature than said primary fuel and having a relatively narrow boiling point temperature range;
   (E) combusting said pilot fuel charge to ignite said primary fuel by HCCI, wherein the steps of injecting the pilot fuel charge and igniting the pilot fuel charge comprise, on a cycle-by-cycle, full load and speed range basis
      (1) initiating pilot fuel injection at a time, Tp,
      (2) continuing pilot fuel injection for a duration, Dp, and
      (3) igniting the pilot fuel charge by compression-ignition at an autoignition point, Ti, occurring an ignition delay interval Di after Tp; and
      (4) controlling at least one of Tp, Dp, and Di to maintain Dp/Di<1.

* * * * *

UNITED STATES PATENT AND TRADEMARK OFFICE
CERTIFICATE OF CORRECTION

| | | |
|---|---|---|
| PATENT NO. | : 7,036,482 B2 | Page 1 of 1 |
| APPLICATION NO. | : 10/628323 | |
| DATED | : May 2, 2006 | |
| INVENTOR(S) | : Beck et al. | |

It is certified that error appears in the above-identified patent and that said Letters Patent is hereby corrected as shown below:

IN THE SPECIFICATION

Col. 9, Line 1      Replace the words "angle a" with --angle $\alpha$--

Col. 18, Line 24-26      Replace the words "includes the same high discharge coefficient injector includes a high discharge coefficient injector" with --includes the same high discharge coefficient injector--

IN THE CLAIMS

CLAIM 8
Col. 21, Line 51      Replace the words "the turbocharger" with -- a turbocharger--

CLAIM 8
Col. 21, Line 52-53      Replace the words "a turbocharger" with -- the turbocharger--

Signed and Sealed this

Twenty-second Day of August, 2006

JON W. DUDAS
*Director of the United States Patent and Trademark Office*